US012717386B2

(12) United States Patent
Shen et al.

(10) Patent No.: US 12,717,386 B2
(45) Date of Patent: Aug. 25, 2026

(54) HINGE MECHANISM AND ELECTRONIC DEVICE

(71) Applicant: Huawei Technologies Co., Ltd., Shenzhen (CN)

(72) Inventors: Hewen Shen, Dongguan (CN); Tuo Shi, Shanghai (CN); Ding Zhong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 18/823,017

(22) Filed: Sep. 3, 2024

(65) Prior Publication Data

US 2024/0427388 A1 Dec. 26, 2024

Related U.S. Application Data

(63) Continuation of application No. PCT/CN2024/080841, filed on Mar. 8, 2024.

(30) Foreign Application Priority Data

Apr. 27, 2023 (CN) ........................ 202310480957.X

(51) Int. Cl.

| | |
|---|---|
| ***G06F 1/16*** | (2006.01) |
| ***H05K 5/00*** | (2025.01) |
| ***H05K 7/00*** | (2006.01) |

(52) U.S. Cl.

CPC .......... *G06F 1/1681* (2013.01); *G06F 1/1652* (2013.01)

(58) Field of Classification Search

CPC .... G06F 1/1681; G06F 1/1652; G06F 1/1675; G06F 1/1616; G06F 1/1618; G06F 1/162; G06F 1/1622; F16C 11/045

See application file for complete search history.

(56) References Cited

U.S. PATENT DOCUMENTS

| | | | | |
|---|---|---|---|---|
| 10,761,574 | B1 * | 9/2020 | Hsu | G06F 1/1616 |
| 11,385,687 | B1 * | 7/2022 | Kim | G06F 1/1616 |
| 12,032,417 | B2 * | 7/2024 | Park | G06F 1/16 |

(Continued)

FOREIGN PATENT DOCUMENTS

| | | |
|---|---|---|
| CN | 111207148 A | 5/2020 |
| CN | 111294436 A | 6/2020 |

(Continued)

*Primary Examiner* — Anthony M Haughton

(74) *Attorney, Agent, or Firm* — Conley Rose, P.C.

(57) ABSTRACT

A hinge mechanism includes a main shaft, a synchronization assembly, and two swing arms, where the two swing arms are respectively disposed on two opposite sides of the main shaft, and the two swing arms are rotatably connected to the main shaft. In addition, along an axial direction of the hinge mechanism, the synchronization assembly is located between the two swing arms. The synchronization assembly includes two gear assemblies. Each gear assembly includes a gear member and a connecting rod. The gear member includes a gear and a connection part. Gear surfaces of the gears of the two gear assemblies are engaged with each other, and the two gears are located between two connection parts. Each connecting rod is located between one connection part and one swing arm, and each connecting rod is slidably connected to the connection part and is rotatably connected to the swing arm.

20 Claims, 11 Drawing Sheets

(56) References Cited

U.S. PATENT DOCUMENTS

| | | | | |
|---|---|---|---|---|
| 2020/0323091 | A1 | 10/2020 | Nagai et al. | |
| 2020/0383219 | A1* | 12/2020 | Hale | G06F 1/1641 |
| 2020/0409428 | A1* | 12/2020 | Wang | H04M 1/0268 |
| 2021/0183383 | A1* | 6/2021 | Volovich | H04R 1/1016 |
| 2021/0204429 | A1 | 7/2021 | Zhang | |
| 2021/0303032 | A1 | 9/2021 | Hong et al. | |
| 2022/0155828 | A1 | 5/2022 | Hsiang et al. | |
| 2023/0021638 | A1* | 1/2023 | Yun | G06F 1/1681 |
| 2023/0081984 | A1* | 3/2023 | Lee | H05K 5/0226 361/807 |
| 2023/0143511 | A1* | 5/2023 | Xi | G06F 1/1681 361/679.27 |
| 2023/0209752 | A1* | 6/2023 | Yun | G06F 1/1652 361/807 |
| 2023/0213983 | A1* | 7/2023 | Yun | G06F 1/1652 361/679.27 |
| 2023/0333598 | A1* | 10/2023 | Yoon | G06F 1/1637 |
| 2024/0414862 | A1* | 12/2024 | Kim | F16C 11/04 |

FOREIGN PATENT DOCUMENTS

| | | | |
|---|---|---|---|
| CN | 109936648 | B | 8/2020 |
| CN | 211370998 | U | 8/2020 |
| CN | 211550435 | U | 9/2020 |
| CN | 211693211 | U | 10/2020 |
| CN | 112443562 | A | 3/2021 |
| CN | 112901645 | A | 6/2021 |
| CN | 216447291 | U | 5/2022 |
| CN | 115150486 | A | 10/2022 |
| CN | 115451008 | A | 12/2022 |
| EP | 4124002 | A1 | 1/2023 |
| IN | 202127016523 | A | 9/2021 |
| WO | 2020052632 | A1 | 3/2020 |
| WO | 2021007907 | A1 | 1/2021 |

* cited by examiner

HINGE MECHANISM AND ELECTRONIC DEVICE

CROSS-REFERENCE TO RELATED APPLICATIONS

This is a continuation of International Patent Application No. PCT/CN2024/080841 filed on Mar. 8, 2024, which claims priority to Chinese Patent Application No. 202310480957.X field on Apr. 27, 2023. The disclosures of the aforementioned applications are hereby incorporated by reference in their entireties.

TECHNICAL FIELD

The present disclosure relates to the field of electronic device technologies, and in particular, to a hinge mechanism and an electronic device.

BACKGROUND

Gradual maturity of flexible display technologies brings great changes to display of an electronic device. Foldable mobile phones, tablet computers, or wearable electronic devices with flexible displays, are an important trend of evolutions for intelligent electronic devices in the future.

A key component of a foldable electronic device is a flexible display featured by continuousness and foldability. A hinge mechanism, as an important component for folding the foldable electronic device, can drive the flexible display to be flattened or bent in unfolding and folding processes of the foldable electronic device. Currently, with the improvement of economy, users impose higher requirements for the foldable electronic device, and structural reliability of the flexible display is a key factor that affects user experience. Therefore, how to improve the structural reliability of the flexible display has become a topic widely studied by a person skilled in the art currently.

SUMMARY

The present disclosure provides a hinge mechanism and an electronic device, to improve structural reliability of a flexible display of the electronic device, thereby improving structural reliability of the electronic device.

According to a first aspect, the present disclosure provides a hinge mechanism. The hinge mechanism is used in a foldable electronic device, the hinge mechanism is disposed corresponding to a bendable portion of a flexible display of the electronic device, and the electronic device is unfolded or folded via the hinge mechanism. Specifically, the hinge mechanism may include a synchronization assembly, a first swing arm, and a second swing arm, where the first swing arm and the second swing arm are respectively disposed on two opposite sides of a main shaft, and the first swing arm and the second swing arm are rotatably connected to the main shaft. The synchronization assembly is located between the first swing arm and the second swing arm along an axial direction of the hinge mechanism. The synchronization assembly includes a first gear assembly and a second gear assembly, the first gear assembly includes a first gear member and a first connecting rod, the first gear member includes a first gear and a first connection part, the first connection part is located on an end part that is of the first gear and that faces the first swing arm, the first connecting rod is slidably connected to the first connection part, the first connecting rod is rotatably connected to the first swing arm, and an axis of the first gear is parallel to and does not coincide with an axis along which the first swing arm rotates around the main shaft. The second gear assembly includes a second gear member and a second connecting rod, the second gear member includes a second gear and a second connection part, a gear surface of the second gear is engaged with a gear surface of the first gear, the second connection part is located on an end part that is of the second gear and that faces the second swing arm, the second connecting rod is slidably connected to the second connection part, the second connecting rod is rotatably connected to the second swing arm, and an axis of the second gear is parallel to and does not coincide with an axis along which the second swing arm rotates around the main shaft.

According to the hinge mechanism provided in the present disclosure, in a process in which the electronic device changes from the unfolded state to the folded state, the first swing arm rotates around the main shaft clockwise, to drive the first gear assembly to rotate along a same direction. In addition, because the first gear assembly is engaged with the second gear assembly through gears, the first gear assembly rotates clockwise to drive the second gear assembly to synchronously rotate counter-clockwise, and the second gear assembly rotates relative to the second swing arm to drive the second swing arm to rotate around the main shaft along a same direction, so that the first gear assembly and the second gear assembly synchronously rotate toward each other. In addition, in a process in which the electronic device changes from the folded state to the unfolded state, a movement direction of each structure is opposite to a movement direction of each structure in the process in which the electronic device changes from the unfolded state to the folded state. In this case, the first gear assembly and the second gear assembly synchronously rotate away from each other. In addition, in the hinge mechanism provided in the present disclosure, a group of engaged gears are used in the synchronization assembly, so that the first swing arm and the second swing arm synchronously move along reverse directions. In this case, transmission precision of the synchronization assembly is relatively high, to help improve rotation reliability of the hinge mechanism. In addition, because a structure of the synchronization assembly is relatively simple, a structure of the hinge mechanism can be effectively simplified. In addition, when the thickness of the hinge mechanism is fixed, the axis of the first gear is parallel to and does not coincide with the axis along which the first swing arm rotates around the main shaft, so that the first gear and the first swing arm are indirectly transmitted via the first connecting rod; and the axis of the second gear is parallel to and does not coincide with the axis along which the second swing arm rotates around the main shaft, so that the second gear and the second swing arm are indirectly transmitted via the second connecting rod. This helps implement a compact design for the hinge mechanism.

In the present disclosure, because the axis of the first gear is parallel to and does not coincide with the axis along which the first swing arm rotates around the main shaft, to enable the first swing arm to rotate around the main shaft to drive the first gear to rotate around the axis of the first gear, the first connection part may be provided with a first insertion slot. In this case, the first connecting rod includes a first sliding part, the first sliding part is inserted into the first insertion slot, and the first sliding part is capable of sliding along the first insertion slot. Similarly, the second connection part is provided with a second insertion slot, the second connecting rod includes a second sliding part, the second sliding part is inserted into the second insertion slot, and the second sliding part is capable of sliding along the second insertion slot. In the process in which the electronic device changes from the unfolded state to the folded state, the first swing arm rotates around the main shaft clockwise to drive the first connecting rod to synchronously rotate clockwise, and the first sliding part of the first connecting rod slides in the first insertion slot along a direction that is first close to an axis center of the first gear and then away from the axis center of the first gear, to drive the first gear to rotate clockwise. In addition, because the first gear is engaged with the second gear, the first gear rotates clockwise to drive the second gear to synchronously rotate counter-clockwise. In this case, when the second connecting rod synchronously rotates with the second gear counter-clockwise, the second sliding part of the second connecting rod is capable of sliding in the second insertion slot of the second connection part along a direction that is first close to an axis center of the second gear and then away from the axis center of the second gear. In this way, the second connecting rod drives the second swing arm to rotate around the main shaft counter-clockwise along a same direction, so that the first gear assembly and the second gear assembly synchronously rotate toward each other. In addition, in the process in which the electronic device changes from the folded state to the unfolded state, a movement direction of each structure is opposite to a movement direction of each structure in the process in which the electronic device changes from the unfolded state to the folded state. In this case, the first gear assembly and the second gear assembly synchronously rotate away from each other. In the hinge mechanism provided in the present disclosure, a connecting rod slides in an insertion slot, to implement rotation transfer between gears with different rotation axes and swing arms. This can improve reliability of rotation transfer between the gears and the swing arms that are connected in a transmission manner.

In a possible implementation of the present disclosure, the first insertion slot is a straight line slot, and the first sliding part is a straight line sliding block. This helps improve smoothness of sliding of the first sliding part along the first insertion slot, to improve smoothness of movement of the first gear with the first swing arm. Similarly, the second insertion slot is a straight line slot, and the second sliding part is a straight line sliding block. This helps improve smoothness of sliding of the second sliding part along the second insertion slot, to improve smoothness of movement of the second gear with the second swing arm.

In a possible implementation of the present disclosure, the hinge mechanism further includes a rotating module, the rotating module includes a first rotating assembly, a second rotating assembly, a first housing mounting bracket, and a second housing mounting bracket, the first housing mounting bracket and the second housing mounting bracket are respectively disposed on two opposite sides of the main shaft, the first rotating assembly is located between the first housing mounting bracket and the second housing mounting bracket, and the second rotating assembly is located between the first housing mounting bracket and the second housing mounting bracket. The first rotating assembly may include a first swing arm, a first support arm, and a first connector, the first swing arm is rotatably connected to the main shaft, the first swing arm is slidably connected to the first housing mounting bracket, the first support arm is rotatably connected to the second housing mounting bracket, the first connector is located between the first swing arm and the first support arm, the first connector is rotatably connected to the first swing arm, and the first connector is rotatably connected to the first support arm. In addition, the main shaft is provided with a first track slot, and the first connector is capable of moving along the first track slot, for limitation on a movement track of the first connector, so that a track along which the first swing arm pulls, via the first connector, the first support arm to move may be limited. The second rotating assembly may include a second swing arm, a second support arm, and a second connector, the second swing arm is rotatably connected to the main shaft, the second swing arm is slidably connected to the second housing mounting bracket, the second support arm is rotatably connected to the first housing mounting bracket, the second connector is located between the second swing arm and the second support arm, the second connector is rotatably connected to the second swing arm, and the second connector is rotatably connected to the second support arm. In addition, the main shaft is provided with a second track slot, and the second connector is capable of moving along the second track slot, for limitation on a movement track of the second connector, so that a track along which the second swing arm pulls, via the second connector, the second support arm to move may be limited.

Based on the foregoing hinge mechanism in the present disclosure, in the process in which the electronic device changes from the unfolded state to the folded state, the first housing mounting bracket and the second housing mounting bracket move toward each other. When the first housing mounting bracket drives the first swing arm to rotate around the main shaft clockwise, the first swing arm may drive the first connector to move toward the first swing arm in the first track slot of the main shaft, to drive the first support arm to rotate around the main shaft counter-clockwise. When the second housing mounting bracket drives the second swing arm to rotate around the main shaft counter-clockwise, the second swing arm may drive the second connector to move toward the second swing arm in the second track slot of the main shaft, to drive the second support arm to rotate around the main shaft clockwise. In the process in which the electronic device changes from the folded state to the unfolded state, the first housing mounting bracket and the second housing mounting bracket move away from each other. When the first housing mounting bracket drives the first swing arm to rotate around the main shaft counter-clockwise, the first swing arm may drive the first connector to move toward the first support arm in the first track slot of the main shaft, to drive the first support arm to rotate around the main shaft clockwise. When the second housing mounting bracket drives the second swing arm to rotate around the main shaft clockwise, the second swing arm may drive the second connector to move toward the second support arm in the second track slot of the main shaft, to drive the second support arm to rotate around the main shaft counter-clockwise. In this way, folding and unfolding functions of the hinge mechanism may be implemented.

Some existing hinge mechanisms need to thicken a rotating assembly connected to a main shaft to ensure stability of the mechanisms. In this way, both the main shaft and the hinge mechanism are very heavy. If the main shaft and the hinge mechanism are forcibly thinned, strength of the rotating assembly is easily weakened, thereby greatly affecting reliability of the hinge mechanisms and shortening a life of the electronic device. The foregoing hinge mechanism in the present disclosure has a simplified structure. According to the foregoing structural relationship, the first connector and the second connector slide in the main shaft to link the first swing arm, the second swing arm, the first support arm, and the second support arm on the left and right sides. Therefore, the first connector and the second connector do not need to be manufactured with very thick thickness sections to travel back and forth in the first track slot and the second track slot of the main shaft. In addition, because the first connector and the second connector are respectively connected to the first swing arm (the second swing arm) and the first support arm (the second support arm), the first connector (the second connector) has a sufficient length extension along a vertical axial direction to have sufficient strength. This can ensure reliability of the hinge mechanism. In this way, the thickness of the main shaft and the thickness of the entire electronic device can be reduced, and reliability of the hinge mechanism can be maintained, so that the entire hinge mechanism is light, thin, and reliable.

In addition, because the first connector is capable of moving in the first track slot according to a specified track, and the second connector is capable of moving in the second track slot according to a specified track, uncontrolled movement of the first connector and the second connector in an entire folding and unfolding process can be avoided, and random movement of the first housing mounting bracket and the second housing mounting bracket can further be avoided, to ensure structural stability and movement stability of the entire hinge mechanism. In some cases, the first track slot and the second track slot are appropriately designed, so that an outer tangent line of the hinge mechanism can keep a constant length in the entire folding and unfolding process, and a flexible display covering the surface of the hinge mechanism can also basically keep a length unchanged. In this way, squeezing or pulling on the flexible display can be effectively avoided, to improve structural reliability of the flexible display and further improve structural reliability of the electronic device.

In a possible implementation of the present disclosure, the main shaft includes a base and a cover, the cover covers the base, the base is provided with a first arc-shaped slot, the cover includes a first protrusion disposed toward the first arc-shaped slot, and a gap between a surface of the first protrusion and a slot surface of the first arc-shaped slot may be used as the first track slot. In addition, the first connector may include a first arc-shaped surface and a second arc-shaped surface, and when the electronic device is in the unfolded state and the folded state, the first arc-shaped surface abuts against the surface of the first protrusion, and the second arc-shaped surface abuts against the slot surface of the first arc-shaped slot. In this way, the surface of the first protrusion and the slot surface of the first arc-shaped slot limit the first connector to the first track slot, so that when the hinge mechanism is in the unfolded state and the folded state, the first connector is relatively stable without any gap-caused shake, and reliability of the hinge mechanism is improved in the foregoing two states.

In addition, the base may further be provided with a third arc-shaped slot, and the cover further includes a third protrusion disposed toward the third arc-shaped slot. A gap between a surface of the third protrusion and a slot surface of the third arc-shaped slot is used as the second track slot, the second connector includes a third arc-shaped surface and a fourth arc-shaped surface, and when the electronic device is in the unfolded state and the folded state, the third arc-shaped surface abuts against the surface of the third protrusion, and the fourth arc-shaped surface abuts against the slot surface of the third arc-shaped slot. In this way, the surface of the third protrusion and the slot surface of the third arc-shaped slot limit the second connector to the second track slot, so that when the hinge mechanism is in the unfolded state and the folded state, the second connector is relatively stable without any gap-caused shake, and reliability of the hinge mechanism is improved in the foregoing two states.

In a possible implementation of the present disclosure, in the process in which the electronic device changes from the unfolded state to the folded state, the first arc-shaped surface abuts against the surface of the first protrusion, and a gap exists between the second arc-shaped surface and the slot surface of the first arc-shaped slot. However, in the process in which the electronic device changes from the folded state to the unfolded state, the second arc-shaped surface abuts against the slot surface of the first arc-shaped slot, and a gap exists between the first arc-shaped surface and the surface of the first protrusion. Therefore, a movement track of the first connector in the first track slot in the process in which the electronic device changes from the unfolded state to the folded state is different from a movement track of the first connector in the first track slot in the process in which the electronic device changes from the folded state to the unfolded state. This helps improve design flexibility of the hinge mechanism.

In addition, in the process in which the electronic device changes from the unfolded state to the folded state, the third arc-shaped surface abuts against the surface of the third protrusion, and a gap exists between the fourth arc-shaped surface and the slot surface of the third arc-shaped slot. In the process in which the electronic device changes from the folded state to the unfolded state, the fourth arc-shaped surface abuts against the slot surface of the third arc-shaped slot, and a gap exists between the third arc-shaped surface and the surface of the third protrusion. Therefore, a movement track of the second connector in the second track slot in the process in which the electronic device changes from the unfolded state to the folded state is different from a movement track of the second connector in the second track slot in the process in which the electronic device changes from the folded state to the unfolded state. This helps improve design flexibility of the hinge mechanism.

In the present disclosure, the movement track of the first connector in the first track slot in the process in which the electronic device changes from the unfolded state to the folded state may be further enabled to be the same as the movement track of the first connector in the first track slot in the process in which the electronic device changes from the folded state to the unfolded state. Specifically, the surface of the first protrusion may be equidistant from the slot surface of the first arc-shaped slot, and in this case, the first track slot is an equal-width slot. In the processes in which the electronic device changes from the unfolded state to the folded state and from the folded state to the unfolded state, the first arc-shaped surface abuts against the surface of the first protrusion, and the second arc-shaped surface abuts against the slot surface of the first arc-shaped slot. This can help improve movement stability of the first connector in the first track slot. Similarly, the surface of the third protrusion may also be equidistant from the slot surface of the third arc-shaped slot, and in this case, the second track slot is an equal-width slot. In addition, in the processes in which the electronic device changes from the unfolded state to the folded state and from the folded state to the unfolded state, the third arc-shaped surface abuts against the surface of the third protrusion, and the fourth arc-shaped surface abuts against the slot surface of the third arc-shaped slot. In this way, the movement track of the second connector in the second track slot in the process in which the electronic device changes from the unfolded state to the folded state is the same as the movement track of the second connector in the second track slot in the process in which the electronic device changes from the folded state to the unfolded state, to improve movement stability of the second connector in the third track slot.

In a possible implementation of the present disclosure, the first arc-shaped surface of the first connector may be a circular arc surface, and the second arc-shaped surface may also be a circular arc surface. In this case, a sum of a radius of the first arc-shaped surface and a radius of the second arc-shaped surface may be equal to a spacing between the surface of the first protrusion and the slot surface of the first arc-shaped slot, to improve smoothness of movement of the first connector in the first track slot.

Similarly, the third arc-shaped surface of the second connector may be a circular arc surface, and the fourth arc-shaped surface may also be a circular arc surface. In this case, a sum of a radius of the third arc-shaped surface and a radius of the fourth arc-shaped surface may be equal to a spacing between the surface of third protrusion and the slot surface of the third arc-shaped slot, to improve smoothness of movement of the second connector in the second track slot.

In the present disclosure, the first swing arm is rotatably connected to the main shaft. The base is provided with a second arc-shaped slot, the first swing arm includes a first arc-shaped rotating block, the first arc-shaped rotating block is accommodated in the second arc-shaped slot, and the first arc-shaped rotating block is capable of sliding along a slot surface of the second arc-shaped slot, for rotatable connection between the first swing arm and the main shaft. Therefore, the first swing arm is rotatably connected to the main shaft in a virtual shaft manner. This helps reduce space occupied by the first swing arm on the main shaft, to help implement a compact design for the hinge mechanism.

In addition, the second swing arm is also rotatably connected to the main shaft. The base is further provided with a fourth arc-shaped slot, the second swing arm includes a second arc-shaped rotating block, the second arc-shaped rotating block is accommodated in the fourth arc-shaped slot, and the second arc-shaped rotating block is capable of sliding along a slot surface of the fourth arc-shaped slot, for rotatable connection between the second swing arm and the main shaft. Therefore, the second swing arm is rotatably connected to the main shaft in a virtual shaft manner. This helps reduce space occupied by the second swing arm on the main shaft, to help implement a compact design for the hinge mechanism.

It may be understood that, for an outward folding electronic device, the first swing arm is rotatably connected to the main shaft via a virtual shaft or a solid shaft, and an axis center at which the first swing arm rotates around the main shaft is located on one side that is of the main shaft and that is away from the flexible display. When the second swing arm is rotatably connected to the main shaft via a virtual shaft or a solid shaft, an axis center at which the second swing arm rotates around the main shaft is located on the side that is of the main shaft and that is away from the flexible display.

To improve reliability of the connection between the first swing arm and the main shaft, in the present disclosure, the cover further includes a second protrusion disposed toward the second arc-shaped slot, and at least a part of the first arc-shaped rotating block is located between the second protrusion and the second arc-shaped slot, so that the first swing arm is limited to the main shaft via the second protrusion and the second arc-shaped slot, and the first swing arm may be prevented from falling off from the second arc-shaped slot.

In addition, the cover further includes a fourth protrusion disposed toward the fourth arc-shaped slot, and at least a part of the second arc-shaped rotating block is located between the fourth protrusion and the fourth arc-shaped slot, so that the second swing arm is limited to the main shaft via the fourth protrusion and the fourth arc-shaped slot, and the second swing arm may be prevented from falling off from the fourth arc-shaped slot.

In a possible implementation of the present disclosure, the first connector includes a first rotating shaft and a second rotating shaft, the first connector is rotatably connected to the first swing arm via the first rotating shaft, the first connector is rotatably connected to the first support arm via the second rotating shaft, and an axis of the first rotating shaft is parallel to and does not coincide with an axis of the second rotating shaft, so that the first swing arm and the first support arm can implement mutual pulling movement via the first connector.

The second connector includes a third rotating shaft and a fourth rotating shaft, the second connector is rotatably connected to the second swing arm via the third rotating shaft, the second connector is rotatably connected to the second support arm via the fourth rotating shaft, and an axis of the third rotating shaft is parallel to and does not coincide with an axis of the fourth rotating shaft, so that the second swing arm and the second support arm can implement mutual pulling movement via the second connector.

Specifically, when the first swing arm is rotatably connected to the first connector via the first rotating shaft, the first arc-shaped rotating block may be provided with a first mounting slot, and a slot opening of the first mounting slot is disposed toward the second arc-shaped slot. The first rotating shaft is mounted in the first mounting slot, a part of a surface of the first rotating shaft is in contact with a slot surface of the first mounting slot, and a part of the surface of the first rotating shaft is in contact with the slot surface of the second arc-shaped slot. The first rotating shaft is mounted in the first mounting slot of the first arc-shaped rotating block, so that a size of the first arc-shaped rotating block can be effectively reduced. This helps a compact design for the hinge mechanism.

In addition, the slot surface of the first mounting slot includes a first circular arc surface, the surface that is of the first rotating shaft and that is in contact with the slot surface of the first mounting slot is a second circular arc surface, and a center of the first circular arc surface coincides with a center of the second circular arc surface. In this way, the first rotating shaft rotates relative to the first arc-shaped rotating block in a process in which the first arc-shaped rotating block slides along the slot surface of the second arc-shaped slot, for rotatable connection between the first swing arm and the first rotating shaft.

The slot surface of the second arc-shaped slot is a third circular arc surface, the surface that is of the first rotating shaft and that is in contact with the slot surface of the second arc-shaped slot is a fourth circular arc surface, and a center of the third circular arc surface coincides with a center of the fourth circular arc surface. In this way, when the first rotating shaft slides along the slot surface of the second arc-shaped slot with the first arc-shaped rotating block, the first rotating shaft may further rotate relative to the first arc-shaped rotating block and the second arc-shaped slot, to help implement movement of the first connector relative to the main shaft.

Similarly, the second arc-shaped rotating block is provided with a second mounting slot, a slot opening of the second mounting slot is disposed toward the fourth arc-shaped slot, the third rotating shaft is mounted in the second mounting slot, a part of a surface of the third rotating shaft is in contact with a slot surface of the second mounting slot, and a part of the surface of the third rotating shaft is in contact with the slot surface of the fourth arc-shaped slot. The third rotating shaft is mounted in the second mounting slot of the second arc-shaped rotating block, so that a size of the second arc-shaped rotating block can be effectively reduced. This helps a compact design for the hinge mechanism.

The second mounting slot may include a fifth circular arc surface, the surface that is of the third rotating shaft and that is in contact with the slot surface of the second mounting slot is a sixth circular arc surface, and a center of the fifth circular arc surface coincides with a center of the sixth circular arc surface. In addition, the slot surface of the fourth arc-shaped slot is a seventh circular arc surface, and the surface that is of the third rotating shaft and that is in contact with the slot surface of the fourth arc-shaped slot may be an eighth circular arc surface. In this case, a center of the seventh circular arc surface coincides with a center of the eighth circular arc surface. In this way, when the third rotating shaft slides along the slot surface of the fourth arc-shaped slot with the second arc-shaped rotating block, the third rotating shaft may further rotate relative to the second arc-shaped rotating block and the fourth arc-shaped slot, to help implement movement of the second connector relative to the main shaft.

In a possible implementation of the present disclosure, the first connector may include a plurality of first sub-connectors that are sequentially rotatably connected. In addition, the plurality of first sub-connectors may be located between the first swing arm and the first support arm, the first swing arm may be rotatably connected to a first sub-connector adjacent to the first swing arm, and the first support arm may be rotatably connected to a first sub-connector adjacent to the first support arm. The first swing arm and the first support arm are connected via the plurality of first sub-connectors. This can effectively improve speed uniformity in a process in which the first swing arm and the first support arm rotate around the main shaft, thereby improving smoothness of mutual pulling movement of the first swing arm and the first support arm.

In addition, the second connector may include a plurality of second sub-connectors that are sequentially rotatably connected. In addition, the plurality of second sub-connectors may be located between the second swing arm and the second support arm, the second swing arm may be rotatably connected to an adjacent second sub-connector, and the second support arm may be rotatably connected to an adjacent second sub-connector. The second swing arm and the second support arm are connected via the plurality of second sub-connectors. This can effectively improve speed uniformity in a process in which the second swing arm and the second support arm rotate around the main shaft, thereby improving smoothness of mutual pulling movement of the second swing arm and the second support arm.

According to a second aspect, the present disclosure further provides an electronic device. The electronic device includes a first housing, a second housing, a flexible display, and the hinge mechanism in the first aspect. The first housing and the second housing are respectively disposed on two opposite sides of the hinge mechanism, and the first housing and the second housing are rotatably connected to the hinge mechanism. The flexible display continuously covers the first housing, the second housing, and the hinge mechanism, and the flexible display is fastened to the first housing and the second housing. When the electronic device is in an unfolded state, the hinge mechanism, the first housing, and the second housing jointly flatly support the flexible display. This can ensure a complete form of the electronic device in the unfolded state. In a process in which the electronic device changes from the unfolded state to a folded state, the two housings synchronously rotate toward each other to drive the flexible display to rotate, and in a process in which the electronic device changes from the folded state to the unfolded state, the two housings synchronously rotate away from each other to drive the flexible display to rotate. This can effectively avoid deformation of the flexible display, and reduce a risk of damage to the flexible display.

Figure 1:
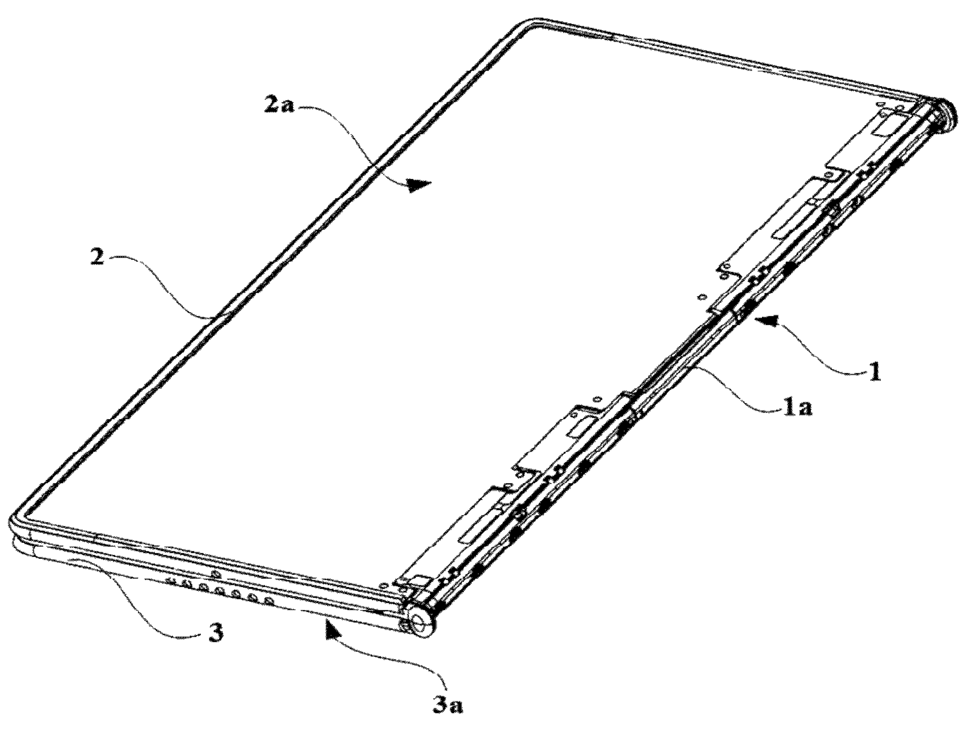
FIG. 1 is a diagram of a structure of an electronic device in a folded state according to an embodiment of the present disclosure.

Reference numerals: 1: hinge mechanism; 1*a*: bearing surface; 1*b*: third appearance surface; 101: main shaft; 1011: base; 10111: first arc-shaped slot; 101111: slot surface of the first arc-shaped slot; 10112: second arc-shaped slot; 101121: third circular arc surface; 10113: third arc-shaped slot; 101131: slot surface of the third arc-shaped slot; 10114: fourth arc-shaped slot; 101141: seventh arc-shaped surface; 1012: cover; 10121: first protrusion; 101211: surface of the first protrusion; 10122: second protrusion; 101221: surface of the second protrusion; 10123: first insertion part; 10124: third protrusion; 101241: surface of the third protrusion; 10125: fourth protrusion; 101251: surface of the fourth protrusion; 1013: first track slot; 1014: second track slot; 102: synchronization assembly; 1021: first gear assembly; 10211: first gear member; 102111: first gear; 102112: first connection part; 1021121: first insertion slot; 10212: first connecting rod; 102121: first sliding part; 102122: first rod part; 1022: second gear assembly; 10221: second gear member; 102211: second gear; 102212: second connection part; 1022121: second insertion slot; 10222: second connecting rod; 102221: second sliding part; 102222: second rod part; 103: first housing mounting bracket; 1031: first sliding groove; 1032: first mounting part; 104: second housing mounting bracket; 1041: second sliding groove; 1042: second mounting part; 105: rotating module; 1051: first rotating assembly; 10511: first swing arm; 105111: first arc-shaped rotating block; 1051111: first recess; 1051112: first mounting slot; 10511121: first circular arc surface; 10512: first support arm; 10513: first connector; 105131: first rotating shaft; 1051311: second circular arc surface; 1051312: fourth circular arc surface; 105132: second rotating shaft; 105133: first arc-shaped surface; 105134: second arc-shaped surface; 1052: second rotating assembly; 10521: second swing arm; 105211: second arc-shaped rotating block; 1052111: second recess; 1052112: second mounting slot; 10521121: fifth circular arc surface; 10522: second support arm; 10523: second connector; 105231: third rotating shaft; 1052311: sixth circular arc surface; 1052312: eighth circular arc surface; 105232: fourth rotating shaft; 105233: third arc-shaped surface; 105234: fourth arc-shaped surface; 2: first housing; 2*a*: first support surface; 2*b*: first appearance surface; and 3: second housing; 3*a*: second support surface; 3*b*: second appearance surface; 4: flexible display; 5: display accommodation space.

DESCRIPTION OF EMBODIMENTS

To make the objectives, technical solutions, and advantages of the present disclosure clearer, the following further describes the present disclosure in detail with reference to the accompanying drawings. Terms used in the following embodiments of the present disclosure are merely intended to describe specific embodiments, but are not intended to limit the present disclosure. The terms “one”, “a” and “this” of singular forms used in this specification and the appended claims of the present disclosure are also intended to include expressions such as “one or more”, unless otherwise specified in the context clearly.

Reference to “an embodiment”, “some embodiments”, or the like described in this specification indicates that one or more embodiments of the present disclosure include a specific feature, structure, or characteristic described with reference to embodiments. Therefore, statements such as “in an embodiment”, “in some embodiments”, “in some other embodiments”, and “in other embodiments” that appear at different places in this specification do not necessarily mean referring to a same embodiment. Instead, the statements mean “one or more but not all of embodiments”, unless otherwise specifically emphasized in another manner. The terms “include”, “have”, and their variants all mean “include but are not limited to”, unless otherwise specifically emphasized in another manner.

For ease of understanding a hinge mechanism provided in embodiments of the present disclosure, the following first describes an application scenario of the hinge mechanism. Use of the hinge mechanism may be in, but is not limited to, a foldable electronic device like a mobile phone, a palmtop computer (e.g., a personal digital assistant (PDA)), a notebook computer, or a tablet computer. In the present disclosure, the electronic device may be an outward folding electronic device, or may be an inward folding electronic device. In a process in which the outward folding electronic device changes from an unfolded state to a folded state, a flexible display is always located on an outer side of the electronic device. When the inward folding electronic device is in a folded state, a flexible display is located on an inner side of the electronic device. In embodiments of the present disclosure, application of the hinge mechanism in the electronic device is described by using the outward folding electronic device as an example. FIG. 1 is a diagram of a structure of an electronic device in a folded state according to an embodiment of the present disclosure. In addition to a hinge mechanism 1, the electronic device may further include two housings and a flexible display. For ease of description, the two housings may be respectively named a first housing 2 and a second housing 3. The first housing 2 and the second housing 3 are located on two sides of the hinge mechanism 1, and can rotate around the hinge mechanism 1. When the electronic device is used, the electronic device may be folded or unfolded in different use scenarios.

FIG. 1 shows a relative position relationship between the hinge mechanism 1 and the two housings when the electronic device is in a folded state. In this case, a first surface of the hinge mechanism 1, a first surface of the first housing, and a first surface of the second housing may be jointly used as a support surface of the flexible display (not shown in FIG. 1). The flexible display is omitted in FIG. 1. The first surface of the hinge mechanism 1 is a surface that is of the hinge mechanism 1 and that faces the flexible display. The first surface of the first housing 2 is a surface that is of the first housing 2 and that faces the flexible display. The first surface of the second housing 3 is a surface that is of the second housing 3 and that faces the flexible display. For ease of description, in the present disclosure, the first surface of the hinge mechanism 1 may be defined as a bearing surface 1*a* of the hinge mechanism 1, the first surface of the first housing 2 may be defined as a first support surface 2*a*, and the first surface of the second housing 3 may be defined as a second support surface 3*a*.

Figure 2A:
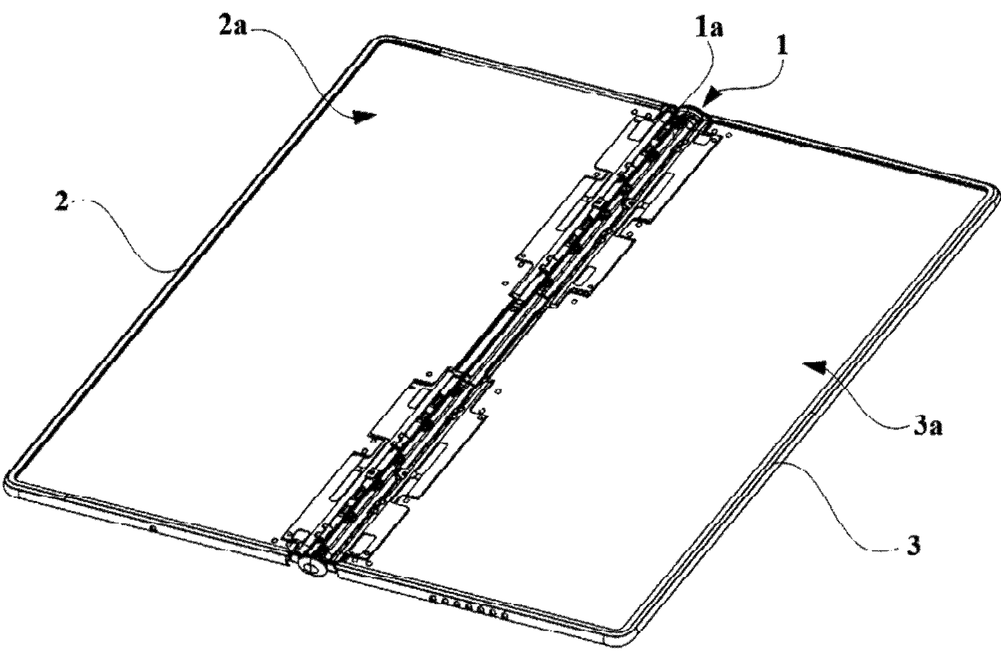
FIG. 2A is a diagram of a structure of an electronic device in an unfolded state according to an embodiment of the present disclosure.

FIG. 2A is a diagram of a structure of an electronic device in an unfolded state. In particular, FIG. 2A shows a structure of the first support surface 2*a* of the first housing 2 and a structure of the second support surface 3*a* of the second housing 3. In the unfolded state, the bearing surface 1*a* of the hinge mechanism 1, the first support surface 2*a* of the first housing 2, and the second support surface 3*a* of the second housing 3 may be connected to form a flat support surface.

In view of this, the flexible display may continuously cover the bearing surface la of the hinge mechanism 1, the first support surface 2*a* of the first housing 2, and the second support surface 3*a* of the second housing 3. The hinge mechanism 1 is disposed corresponding to a bendable part of the flexible display, and the flexible display may be fixedly connected to the first support surface 2*a* of the first housing 2 and the second support surface 3*a* of the second housing 3. A connection manner of the flexible display may be but is not limited to bonding. In this way, when the electronic device is in the unfolded state shown in FIG. 2A, the hinge mechanism 1, the first housing 2, and the second housing 3 may flatly support the flexible display.

Figure 2B:
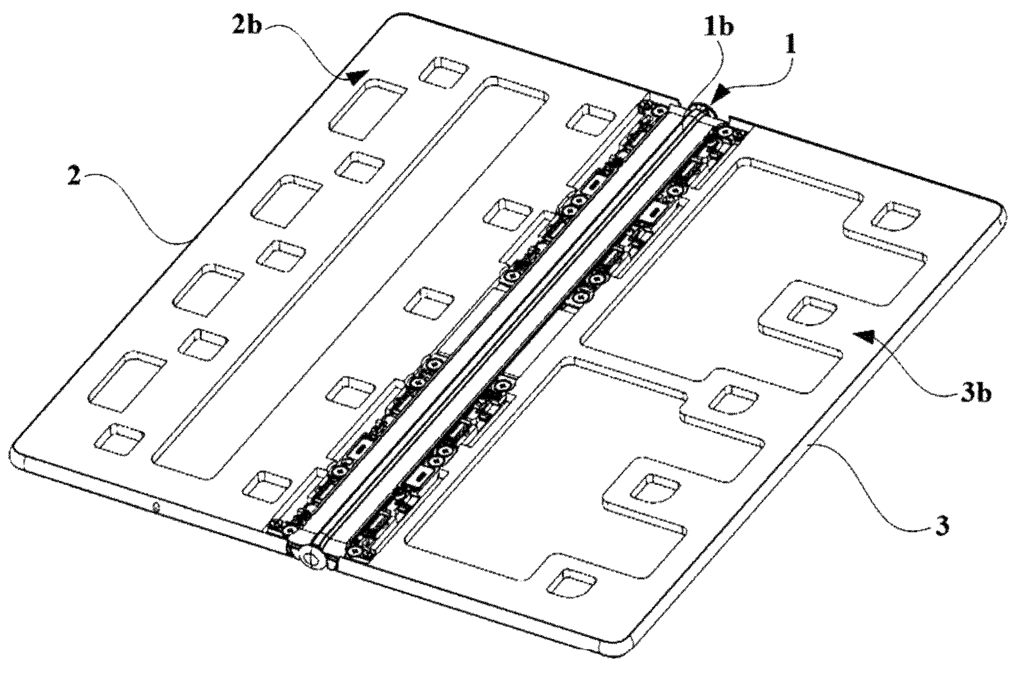
FIG. 2B is a diagram of another structure of an electronic device in an unfolded state according to an embodiment of the present disclosure.

In addition, FIG. 2B is a diagram of another structure of an electronic device in an unfolded state according to an embodiment of the present disclosure. FIG. 2B shows structures of a second surface of the hinge mechanism 1, a second surface of the first housing 2, and a second surface of the second housing 3. The second surface of the hinge mechanism 1 is a surface that is of the hinge mechanism 1 and that is away from the flexible display, the second surface of the first housing 2 is a surface that is of the first housing 2 and that is away from the flexible display, and the second surface of the second housing 3 is a surface that is of the second housing 3 and that is away from the flexible display. In this case, the first surface and the second surface of the hinge mechanism 1 are disposed opposite to each other, the first surface and the second surface of the first housing 2 are disposed opposite to each other, and the first surface and the second surface of the second housing 3 are disposed opposite to each other. In the present disclosure, the second surface of the hinge mechanism 1, the second surface of the first housing 2, and the second surface of the second housing 3 may be used as an appearance surface of the electronic device. For ease of description, the second surface of the first housing 2 may be defined as a first appearance surface 2*b*, the second surface of the second housing 3 may be defined as a second appearance surface 3*b*, and the second surface of the hinge mechanism 1 may be defined as a third appearance surface 1*b*. It may be understood that, for the outward folding electronic device, the appearance surface of the electronic device is exposed outside the electronic device when the electronic device is in the unfolded state, and the appearance surface of the electronic device is located inside the electronic device when the electronic device is in the folded state. In the present disclosure, in a process in which the first housing 2 and the second housing 3 relatively rotate from the unfolded state shown in FIG. 2A or FIG. 2B to the folded state shown in FIG. 1 or from the folded state shown in FIG. 1 to the unfolded state shown in FIG. 2A or FIG. 2B, the flexible display may be bent or flattened with the first housing 2 and the second housing 3. In addition, it may be understood that a process in which the electronic device changes from the unfolded state shown in FIG. 2A or FIG. 2B to the folded state shown in FIG. 1 or from the folded state shown in FIG. 1 to the unfolded state shown in FIG. 2A or FIG. 2B is a process in which the first housing 2 and the second housing 3 rotate around the hinge mechanism 1.

The hinge mechanism 1 as a key functional component in the foldable electronic device may be disposed corresponding to a foldable part of the flexible display. In the process in which the first housing 2 and the second housing 3 of the electronic device rotate around the hinge mechanism 1, if forces applied by the first housing 2 and the second housing 3 to the flexible display are not synchronous, stress on the flexible display is likely to be nonuniform. Consequently, the flexible display is squeezed or pulled, or even the flexible display is damaged.

In view of this, a synchronization assembly is disposed in the hinge mechanism provided in the present disclosure, to help the first housing and the second housing of the electronic device synchronously move toward each other or away from each other around the hinge mechanism, so that a part that is of the flexible display and that is connected to the first housing and a part that is of the flexible display and that is connected to the second housing can synchronously move toward each other or away from each other. This can improve uniformity of the stress on the flexible display, and effectively reduce a risk that the flexible display is squeezed or pulled, to prolong a service life of the flexible display, and further improve structural reliability of the electronic device. To facilitate understanding of the hinge mechanism provided in embodiments of the present disclosure, the following describes a specific structure of the hinge mechanism in detail with reference to the accompanying drawings.

Figure 3:
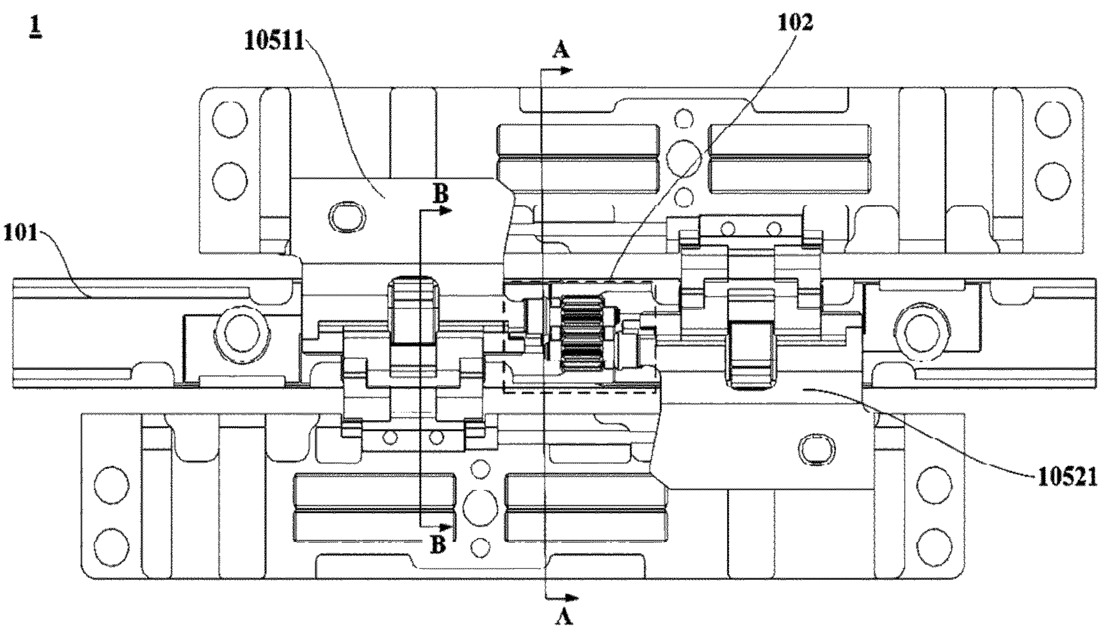
FIG. 3 is a diagram of a structure of a hinge mechanism according to an embodiment of the present disclosure.

FIG. 3 is a diagram of a structure of the hinge mechanism 1 according to an embodiment of the present disclosure. In the present disclosure, the hinge mechanism 1 may include a main shaft 101 and a synchronization assembly 102. A quantity of synchronization assemblies 102 in the hinge mechanism 1 is not limited in the present disclosure. The hinge mechanism 1 may include only one synchronization assembly 102, or may include a plurality of synchronization assemblies 102. When the hinge mechanism 1 includes a plurality of synchronization assemblies 102, the plurality of synchronization assemblies 102 may be arranged at spacings along a length direction of the hinge mechanism 1. In the present disclosure, the length direction of the hinge mechanism 1 is an extension direction of an axis along which the first housing 2 and the second housing 3 rotate around the hinge mechanism 1 shown in FIG. 2B.

Figure 4:
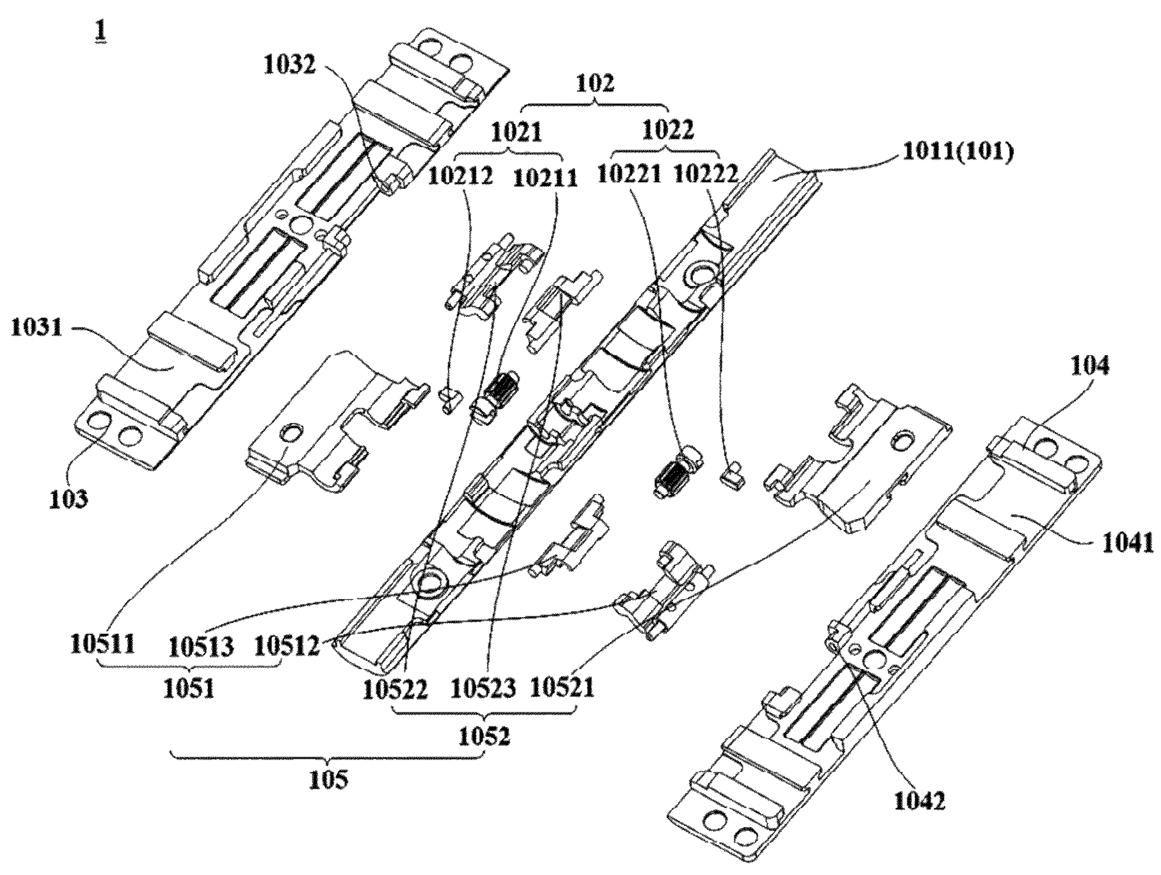
FIG. 4 is an exploded view of the hinge mechanism shown in FIG. 3.

FIG. 4 is an exploded view of the hinge mechanism 1 shown in FIG. 3. In the present disclosure, the hinge mechanism 1 may further include a first swing arm 10511 and a second swing arm 10521, where the first swing arm 10511 and the second swing arm 10521 are respectively disposed on two opposite sides of the main shaft 101, the first swing arm 10511 is rotatably connected to the main shaft 101, and the second swing arm 10521 is rotatably connected to the main shaft 101. Refer to FIG. 3 and FIG. 4 together. The synchronization assembly 102 may be located between the first swing arm 10511 and the second swing arm 10521 along an axial direction of the hinge mechanism 1.

The synchronization assembly 102 may include a first gear assembly 1021 and a second gear assembly 1022. The first gear assembly 1021 is rotatably connected to the first swing arm 10511, and an axis along which the first swing arm 10511 rotates around the main shaft 101 is parallel to and does not coincide with an axis along which the first gear assembly 1021 rotates around the first swing arm 10511. In a process in which the first swing arm 10511 rotates around the main shaft 101, the first gear assembly 1021 may be driven to rotate along a same direction relative to the main shaft 101. The second gear assembly 1022 is rotatably connected to the second swing arm 10521, and an axis along which the second swing arm 10521 rotates around the main shaft 101 is parallel to and does not coincide with an axis along which the second gear assembly 1022 rotates around the second swing arm 10521. In a process in which the second swing arm 10521 rotates around the main shaft 101, the second gear assembly 1022 may be driven to rotate along a same direction relative to the main shaft 101.

Figure 5:
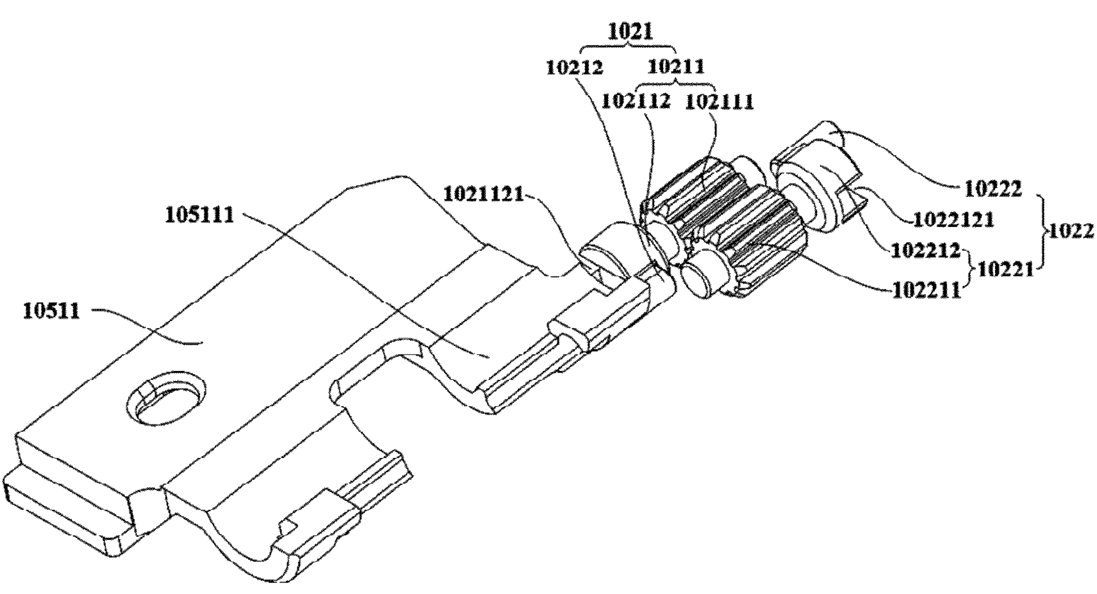
FIG. 5 is a diagram of a structure of connecting a first swing arm to a synchronization assembly according to an embodiment of the present disclosure.

Still refer to FIG. 4. In the present disclosure, the first gear assembly 1021 may include a first gear member 10211 and a first connecting rod 10212, and the second gear assembly 1022 may include a second gear member 10221 and a second connecting rod 10222. In addition, refer to FIG. 5. FIG. 5 is a diagram of a structure of connecting the first swing arm 10511 to the synchronization assembly 102 according to an embodiment of the present disclosure. The first gear member 10211 includes a first gear 102111, the second gear member 10221 includes a second gear 102211, a gear surface of the first gear 102111 is engaged with a gear surface of the second gear 102211, and an axis of the first gear 102111 is parallel to and does not coincide with the axis along which the first swing arm 10511 rotates around the main shaft 101, and similarly, an axis of the second gear 102211 is parallel to and does not coincide with the axis along which the second swing arm 10521 rotates around the main shaft 101 shown in FIG. 4.

Figure 6:
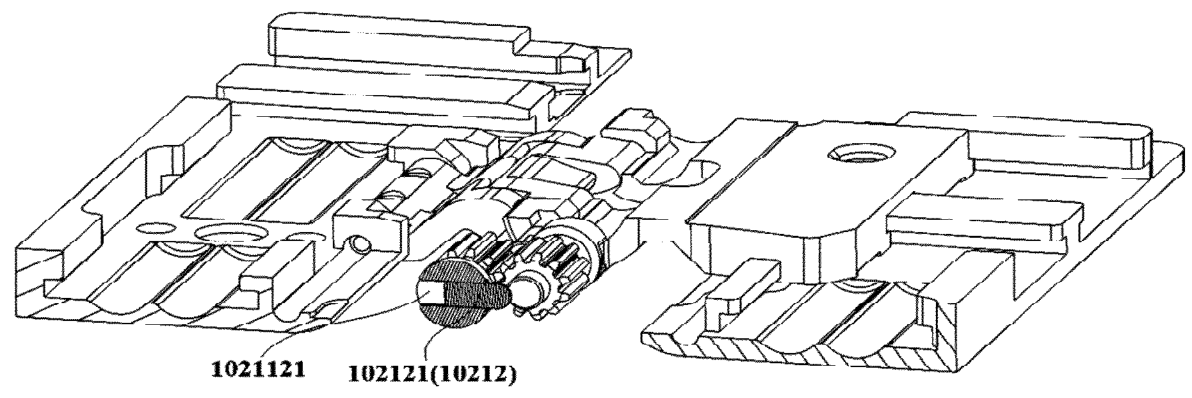
FIG. 6 is an A-A sectional view of the hinge mechanism shown in FIG. 3.

In the present disclosure, the first gear member 10211 is detachably connected to the first connecting rod 10212. Still refer to FIG. 5. During specific implementation, the first gear member 10211 may further include a first connection part 102112, and the first connection part 102112 is located on an end part that is of the first gear 102111 and that faces the first swing arm 10511. In addition, refer to FIG. 6. FIG. 6 is an A-A sectional view of the hinge mechanism 1 shown in FIG. 3. The first connection part 102112 is provided with a first insertion slot 1021121, and the first insertion slot 1021121 may be but is not limited to a straight line slot. In addition, the first connecting rod 10212 may include a first sliding part 102121, and the first sliding part 102121 may be inserted into the first insertion slot 1021121. It may be understood that, when the first insertion slot 1021121 is a straight line slot, the first sliding part 102121 may be a straight line sliding block. This helps improve smoothness of sliding of the first sliding part 102121 along the first insertion slot 1021121. In this way, in the process in which the first swing arm 10511 rotates around the main shaft 101, the first sliding part 102121 is capable of sliding along the first insertion slot 1021121, so that the first swing arm 10511 drives the first gear 102111 to rotate.

Figure 7:
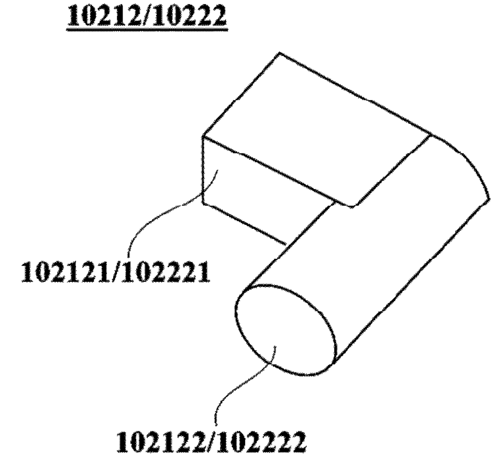
FIG. 7 is a diagram of a structure of a first connecting rod according to an embodiment of the present disclosure.

In the present disclosure, the first connecting rod 10212 rotates relative to the first swing arm 10511. It may be understood that the axis along which the first swing arm 10511 rotates around the main shaft 101 is parallel to and does not coincide with the axis along which the first connecting rod 10212 rotates around the first swing arm 10511. To implement connection between the first connecting rod 10212 and the first swing arm 10511, the first swing arm 10511 may be provided with a first jack (not shown in FIG. 5). FIG. 7 is a diagram of a structure of the first connecting rod 10212 according to an embodiment of the present disclosure. The first connecting rod 10212 further includes a first rod part 102122. The first rod part 102122 may be inserted into the first jack, and the first rod part 102122 may rotate relative to the first swing arm 10511 in the first jack.

When the second gear assembly 1022 is specifically disposed, the second gear member 10221 is detachably connected to the second connecting rod 10222. Still refer to FIG. 5. The second gear member 10221 may further include a second connection part 102212, and the second connection part 102212 is located on an end part that is of the second gear 102211 and that faces the second swing arm 10521. The second connection part 102212 is provided with a second insertion slot 1022121, and the second insertion slot 1022121 may be but is not limited to a straight line slot. In addition, as shown in FIG. 7, FIG. 7 may also indicate a structure of the second connecting rod 10222. The second connecting rod 10222 may include a second sliding part 102221, and the second sliding part 102221 may be inserted into the second insertion slot. It may be understood that, when the second insertion slot 1022121 is a straight line slot, the second sliding part 102221 may be a straight line sliding block. This helps improve smoothness of sliding of the second sliding part 102221 along the second insertion slot 1022121. In this way, in the process in which the second swing arm 10521 rotates around the main shaft, the second sliding part 102221 is capable of sliding along the second insertion slot 1022121, so that the second swing arm 10521 drives the second gear 102211 to rotate.

In the present disclosure, the second connecting rod 10222 rotates relative to the second swing arm 10521. When the second connecting rod 10222 is rotatably connected to the second swing arm 10521, the second arc-shaped rotating block 105211 may be provided with a second jack (not shown in FIG. 5). As shown in FIG. 7, the second connecting rod 10222 may further include a second rod part 102222. The second rod part 102222 may be inserted into the second jack, and the second rod part 102222 may rotate relative to the second swing arm 10521 in the second jack. It may be understood that, in the present disclosure, the axis along which the second swing arm 10521 rotates around the main shaft 101 is parallel to and does not coincide with the axis along which the second connecting rod 10222 rotates around the second swing arm 10521.

Based on the foregoing descriptions of the hinge mechanism 1 provided in embodiments of the present disclosure, in the process in which the electronic device changes from the unfolded state to the folded state, the first swing arm 10511 rotates around the main shaft 101 clockwise to drive the first connecting rod 10212 to synchronously rotate clockwise, and the first sliding part 102121 of the first connecting rod 10212 slides in the first insertion slot 1021121 of the first connection part 102112 along a direction that is first close to an axis center of the first gear 102111 and then away from the axis center of the first gear 102111, to drive the first gear 102111 to rotate clockwise. In addition, because the first gear 102111 is engaged with the second gear 102211, the first gear 102111 rotates clockwise to drive the second gear 102211 to synchronously rotate counter-clockwise. In this case, when the second connecting rod 10222 synchronously rotates counter-clockwise with the second gear 102211, the second sliding part 102221 of the second connecting rod 10222 is capable of sliding in the second insertion slot 1022121 of the second connection part 102212 along a direction that is first close to an axis center of the second gear 102211 and then away from the axis center of the second gear 102211, so that the second connecting rod 10222 drives the second swing arm 10521 to rotate around the main shaft 101 along a same direction counter-clockwise, and then the first gear assembly 1021 and the second gear assembly 1022 synchronously rotates toward each other. In addition, in the process in which the electronic device changes from the folded state to the unfolded state, a movement direction of each structure is opposite to a movement direction of each structure in the process in which the electronic device changes from the unfolded state to the folded state. In this case, the first gear assembly 1021 and the second gear assembly 1022 synchronously rotate away from each other.

A group of engaged gears are used in the synchronization assembly 102 of the hinge mechanism 1 provided in the present disclosure, so that the first swing arm 10511 and the second swing arm 10521 synchronously move along reverse directions. In this case, transmission precision of the synchronization assembly 102 is high, to help improve rotation reliability of the hinge mechanism 1. In addition, because a structure of the synchronization assembly 102 is relatively simple, a structure of the hinge mechanism 1 can be effectively simplified. In addition, when the thickness of the hinge mechanism 1 is fixed, the axis of the first gear 102111 is parallel to and does not coincide with the axis along which the first swing arm 10511 rotates around the main shaft 101, so that the first gear 102111 and the first swing arm 10511 are indirectly transmitted via the first connecting rod 10212; and the axis of the second gear 102211 is parallel to and does not coincide with the axis along which the second swing arm 10521 rotates around the main shaft 101, so that the second gear 102211 and the second swing arm 10521 are indirectly transmitted via the second connecting rod 10222. This helps implement a compact design for the hinge mechanism 1

It should be noted that in the present disclosure, the axis of the first gear 102111 is parallel to and does not coincide with the axis along which the first swing arm 10511 rotates around the main shaft 101, and the axis of the second gear 102211 is parallel to and does not coincide with the axis along which the second swing arm 10521 rotates around the main shaft 101. In this case, in a rotation process of the electronic device, rotation transfer between the first gear 102111 and the first swing arm 10511 is implemented by sliding of the first connecting rod 10212 relative to the first gear member 10211, and rotation transfer between the second gear 102211 and the second swing arm 10521 is implemented by sliding of the second connecting rod 10222 relative to the second gear member 10221, so that reliability of rotation transfer between the first swing arm 10511 and the first gear 102111 and between the second swing arm 10521 and the second gear 102211 can be improved.

In the present disclosure, in addition to being used as a driving component of the synchronization assembly 102, the first swing arm 10511 may be further configured to implement a rotation function of the hinge mechanism 1. During specific implementation, the hinge mechanism 1 may further include a rotating module 105. A quantity of rotating modules 105 in the hinge mechanism 1 is not limited in the present disclosure. The hinge mechanism 1 may include only one rotating module 105, or may include a plurality of rotating modules 105. Still refer to FIG. 3 and FIG. 4. When the hinge mechanism 1 includes a plurality of rotating modules 105, the plurality of rotating modules 105 may be arranged at spacings along an axial direction of the hinge mechanism 1.

For ease of understanding a structure of the rotating module 105, still refer to FIG. 4. The rotating module 105 may include a first rotating assembly 1051, a second rotating assembly 1052, a first housing mounting bracket 103, and a second housing mounting bracket 104. The first housing mounting bracket 103 and the second housing mounting bracket 104 are respectively disposed on two opposite sides of the main shaft 101, the first rotating assembly 1051 is located between the first housing mounting bracket 103 and the second housing mounting bracket 104, and the second rotating assembly 1052 is located between the first housing mounting bracket 103 and the second housing mounting bracket 104. In addition, as shown in FIG. 4, the main shaft 101 of the hinge mechanism 1 may be used as a bearing component of the first rotating assembly 1051 and the second rotating assembly 1052.

It should be noted that, in embodiments of the present disclosure, when there is a plurality of rotating modules 105, first rotating assemblies 1051 and second rotating assemblies 1052 of the plurality of rotating modules 105 may all use the same main shaft 101 as the bearing component, to improve an integration degree of the hinge mechanism 1. In some other possible embodiments of the present disclosure, one main shaft 101 may be correspondingly disposed for each rotating module 105 in the hinge mechanism 1, so that a corresponding main shaft 101 is used as a bearing component for a first rotating assembly 1051 and a second rotating assembly 1052 of each rotating module 105.

Still refer to FIG. 4. In addition to including the first swing arm 10511, the first rotating assembly 1051 may further include a first support arm 10512 and a first connector 10513. The first connector 10513 is located between the first swing arm 10511 and the first support arm 10512, the first connector 10513 is rotatably connected to the first swing arm 10511, and the first connector 10513 is rotatably connected to the first support arm 10512, so that the first swing arm 10511 and the first support arm 10512 perform mutual pulling movement via the first connector 10513. In view of this, it may be understood that a movement track of the first connector 10513 plays a key role in a movement track of the first rotating assembly 1051.

Figure 8:
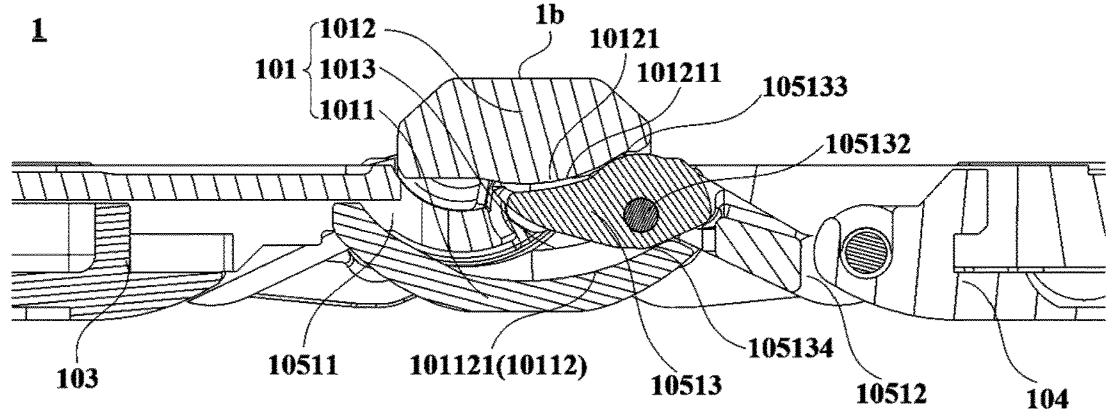
FIG. 8 is a sectional view of a first connector of a hinge mechanism when an electronic device is in an unfolded state according to an embodiment of the present disclosure.

In the present disclosure, the first connector 10513 is capable of moving relative to the main shaft 101. In practice, refer to FIG. 8. FIG. 8 is a sectional view of the first connector 10513 of the hinge mechanism 1 when the electronic device is in the unfolded state according to an embodiment of the present disclosure. The main shaft 101 may be provided with a first track slot 1013, and the first connector 10513 is capable of moving along the first track slot 1013, for limitation on a movement track of the first connector 10513.

Figure 9:
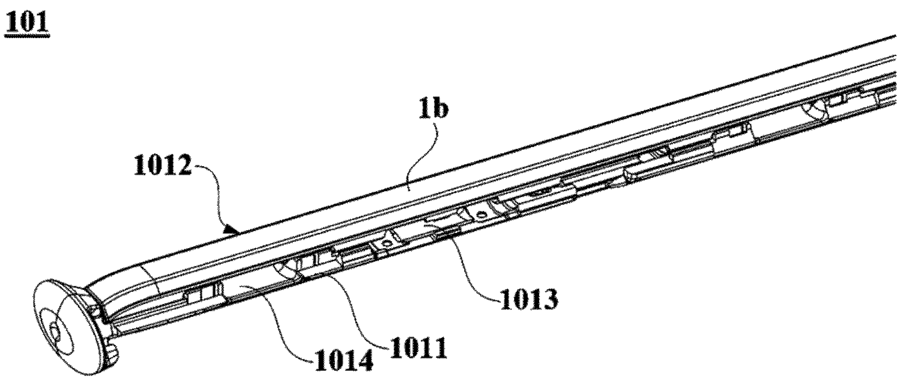
FIG. 9 is a diagram of a structure of a main shaft according to an embodiment of the present disclosure.
Figure 10:
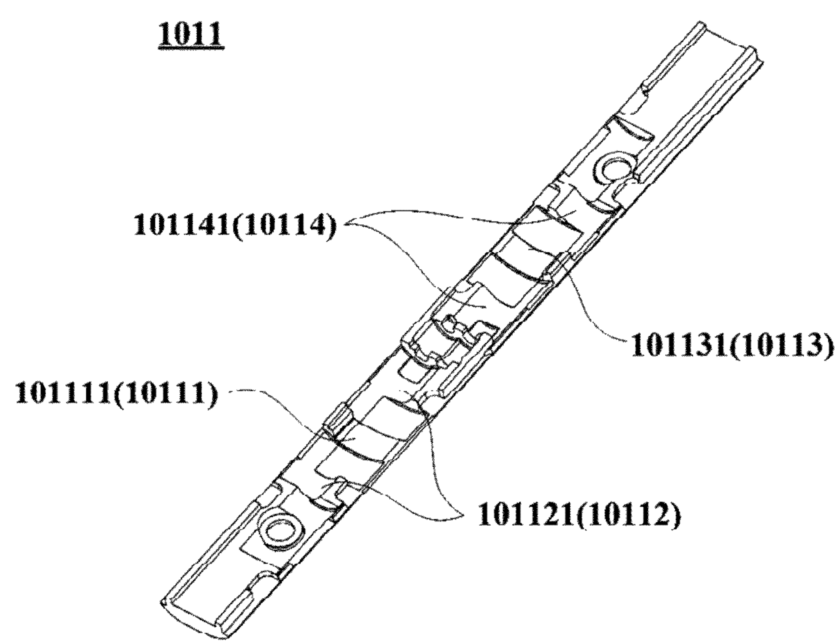
FIG. 10 is a diagram of a structure of a base of the main shaft shown in FIG. 9.
Figure 11:
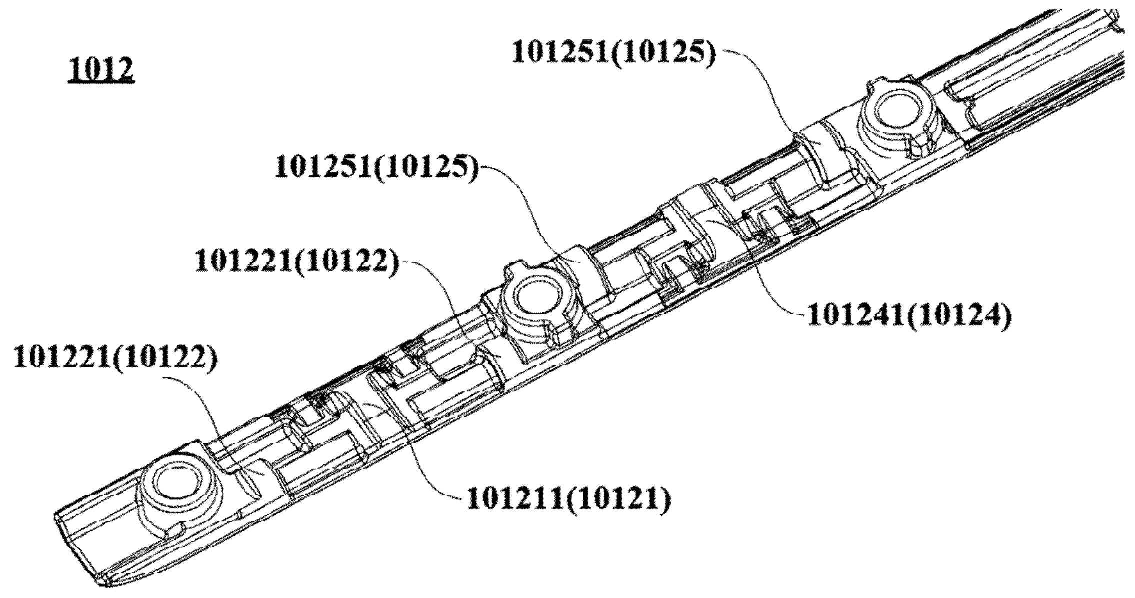
FIG. 11 is a diagram of a structure of a cover of the main shaft shown in FIG. 9.

FIG. 9 is a diagram of a structure of the main shaft 101 according to an embodiment of the present disclosure. The main shaft 101 may further include a base 1011 and a cover 1012. The cover 1012 covers the base 1011, and an outer surface of the cover 1012 may be used as the third appearance surface **1*b* of the hinge mechanism 1. FIG. 10 is a diagram of a structure of the base 1011 of the main shaft 101 shown in FIG. 9. The base 1011 may be provided with a first arc-shaped slot 10111. Refer to FIG. 8 and FIG. 10 together. The first connector 10513 is accommodated in the first arc-shaped slot 10111, and the first connector 10513 is capable of sliding along a slot surface 101111 of the first arc-shaped slot. In addition, refer to FIG. 11. FIG. 11 is a diagram of a structure of the cover 1012 of the main shaft 101 shown in FIG. 10. FIG. 11 is used to show a structure of a side that is of the cover 1012 and that faces the base 1011. The cover 1012 includes a first protrusion 10121. As shown in FIG. 8, the first protrusion 10121 may be disposed toward the first arc-shaped slot 10111. A gap exists between a surface 101211 of the first protrusion and the slot surface 101111 of the first arc-shaped slot, and the gap is used as the first track slot 1013**.

Figure 12:
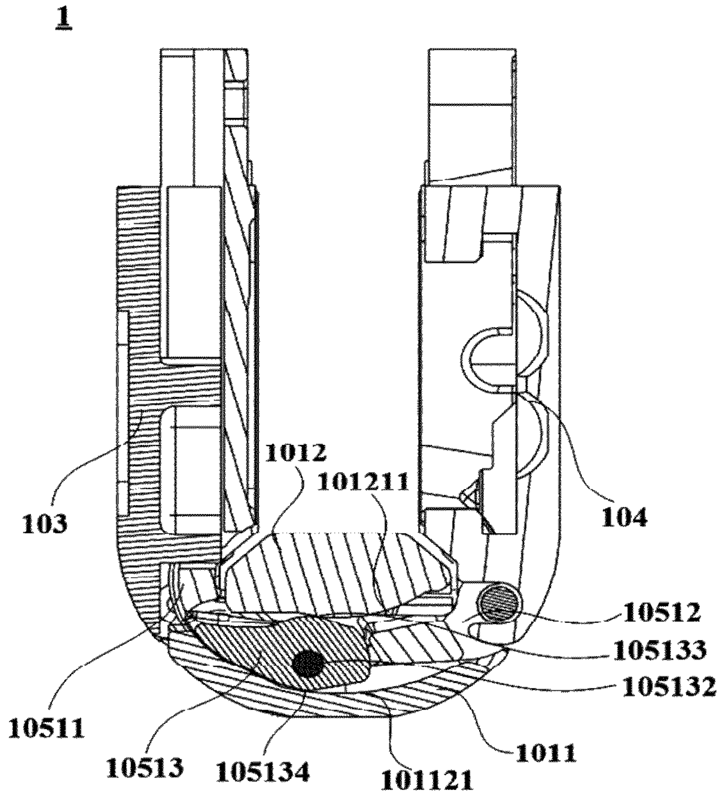
FIG. 12 is a sectional view of a first connector of a hinge mechanism when an electronic device is in a folded state according to an embodiment of the present disclosure.

FIG. 12 is a sectional view of the first connector 10513 of the hinge mechanism 1 when the electronic device is in the folded state according to an embodiment of the present disclosure. Refer to FIG. 8 and FIG. 12 together. In the process in which the electronic device changes from the unfolded state to the folded state, the first connector 10513 is capable of moving toward the first swing arm 10511 in the first track slot 1013. In the process in which the electronic device changes from the folded state to the unfolded state, the first connector 10513 is capable of moving toward the first support arm 10512 in the first track slot 1013. In this way, the first connector 10513 is capable of moving relative to the main shaft 101 according to a specified track.

Refer to FIG. 8 and FIG. 12 together. It can be seen that, in the process in which the electronic device changes from the unfolded state to the folded state or from the folded state to the unfolded state, the first swing arm 10511 and the first support arm 10512 can rotate around the main shaft 101. In addition, because the first swing arm 10511 and the first support arm 10512 perform mutual pulling movement via the first connector 10513, the first connector 10513 can further rotate relative to the surface 101211 of the first protrusion and the slot surface 101111 of the first arc-shaped slot in a process in which the first connector 10513 moves in the first track slot 1013, to improve smoothness of movement of the first rotating assembly 1051.

Figure 13:
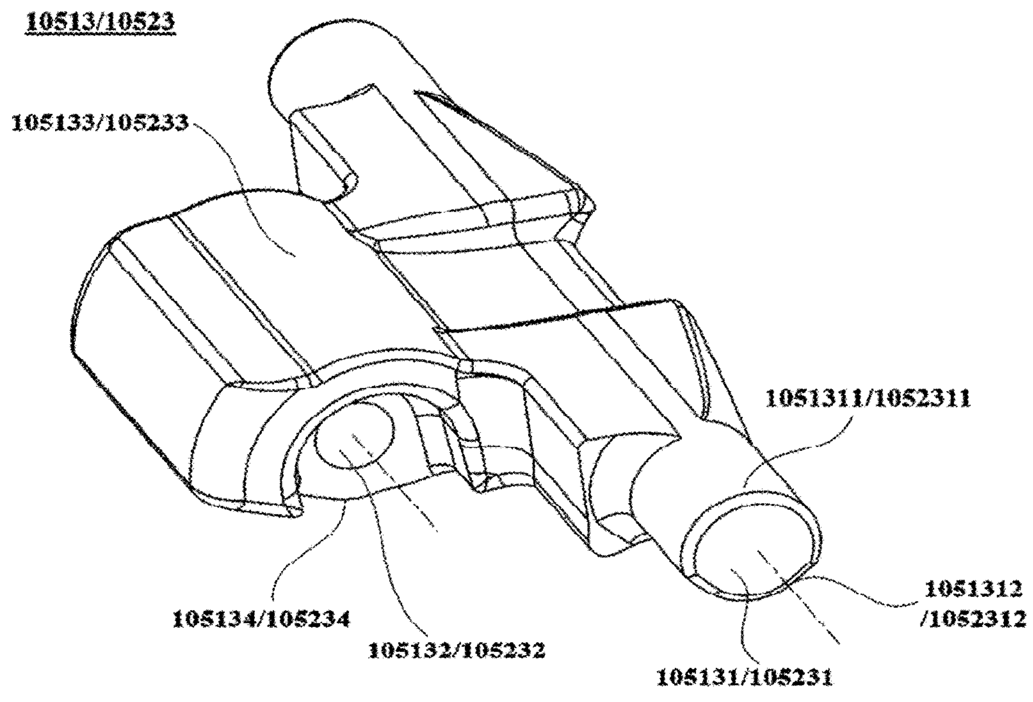
FIG. 13 is a diagram of a structure of a first connector according to an embodiment of the present disclosure.

FIG. 13 is a diagram of a structure of the first connector 10513 according to an embodiment of the present disclosure. In the present disclosure, the first connector 10513 may include a first arc-shaped surface 105133 and a second arc-shaped surface 105134. To implement rotation of the first connector 10513 relative to the surface 101211 of the first protrusion and the slot surface 101111 of the first arc-shaped slot, the first arc-shaped surface 105133 and the second arc-shaped surface 105134 may be circular arc surfaces, and a center of the first arc-shaped surface 105133 coincides with a center of the second arc-shaped surface 105134. Radii of the first arc-shaped surface 105133 and the second arc-shaped surface 105134 may be equal or unequal, which is not limited in the present disclosure. In addition, considering design tolerance, the first arc-shaped surface 105133 and the second arc-shaped surface 105134 may also be arc surfaces of other possible forms such as an elliptical arc surface, provided that the first connector 10513 can rotate relative to the surface 101211 of the first protrusion and the slot surface 101111 of the first arc-shaped slot.

Still refer to FIG. 8 and FIG. 12. When the electronic device is in the unfolded state shown in FIG. 8 and the folded state shown in FIG. 12, the first arc-shaped surface 105133 of the first connector 10513 may abut against the surface 101211 of the first protrusion, and the second arc-shaped surface 105134 abuts against the slot surface 101111 of the first arc-shaped slot. In this way, the surface 101211 of the first protrusion and the slot surface 101111 of the first arc-shaped slot limit the first connector 10513 to the first track slot 1013, so that when the hinge mechanism 1 is in the unfolded state and the folded state, the first connector 10513 is relatively stable without any gap-caused shake, and reliability of the hinge mechanism 1 is improved in the foregoing two states.

In the present disclosure, when the electronic device is in the unfolded state shown in FIG. 8, a distance between a point at which the surface 101211 of the first protrusion abuts against the first arc-shaped surface 105133 and a point at which the slot surface 101111 of the first arc-shaped slot abuts against the second arc-shaped surface 105134 may be denoted as d1. When the electronic device is in the folded state shown in FIG. 12, a distance between a point at which the surface 101211 of the first protrusion abuts against the first arc-shaped surface 105133 and a point at which the slot surface 101111 of the first arc-shaped slot abuts against the second arc-shaped surface 105134 is denoted as d2. When the electronic device is in the unfolded state and the folded state, the first arc-shaped surface 105133 of the first connector 10513 may abut against the surface 101211 of the first protrusion, and the second arc-shaped surface 105134 abuts against the slot surface 101111 of the first arc-shaped slot. Therefore, when both the first arc-shaped surface 105133 and the second arc-shaped surface 105134 are circular arc surfaces, d1=d2 may be obtained.

In the present disclosure, specific disposing forms of the surface 101211 of the first protrusion and the slot surface 101111 of the first arc-shaped slot are not limited. For example, the surface 101211 of the first protrusion may be a circular arc surface, and the slot surface 101111 of the first arc-shaped slot may be a circular arc surface. In addition, a circle center of the surface 101211 of the first protrusion coincides with a circle center of the slot surface 101111 of the first arc-shaped slot. In some other possible embodiments of the present disclosure, both the surface 101211 of the first protrusion and the slot surface 101111 of the first arc-shaped slot may be configured as planes, so that the first track slot 1013 is a straight line slot. Alternatively, both the surface 101211 of the first protrusion and the slot surface 101111 of the first arc-shaped slot may be curved surfaces in other forms, so that the first track slot 1013 is a curved slot in any form, which should be understood as falling within the protection scope of the present disclosure.

Still refer to FIG. 8. In the present disclosure, the surface 101211 of the first protrusion may be equidistant from the slot surface 101111 of the first arc-shaped slot, and in this case, the first track slot 1013 is an equal-width slot. In the processes in which the electronic device changes from the unfolded state to the folded state and from the folded state to the unfolded state, the surface 101211 of the first protrusion keeps an abut-against state with the first arc-shaped surface 105133, and the slot surface 101111 of the first arc-shaped slot keeps an abut-against state with the second arc-shaped surface 105134. Therefore, in the processes in which the electronic device changes from the unfolded state to the folded state and from the folded state to the unfolded state, movement tracks of the first connector 10513 may be the same. This can help improve movement stability of the first connector 10513, to improve movement stability of the first rotating assembly 1051.

Figure 14:
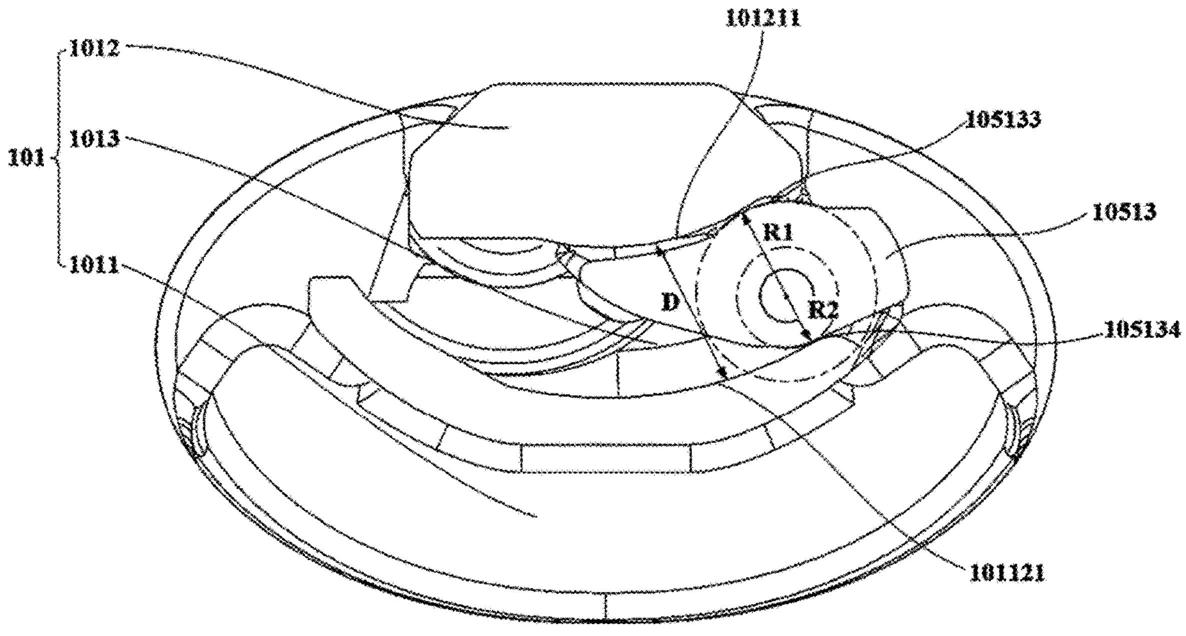
FIG. 14 is a diagram of an assembly structure of a first connector and a main shaft according to an embodiment of the present disclosure.

FIG. 14 is a diagram of an assembly structure of the first connector 10513 and the main shaft 101 according to an embodiment of the present disclosure. In the present disclosure, when the first track slot 1013 is an equal-width slot, and the first arc-shaped surface 105133 and the second arc-shaped surface 105134 are circular arc surfaces, a sum of a radius R1 of the first arc-shaped surface 105133 and a radius R2 of the second arc-shaped surface 105134 is equal to a spacing D between the surface 101211 of the first protrusion and the slot surface 101111 of the first arc-shaped slot. In addition, in consideration of smoothness of movement of the first connector 10513 in the first track slot 1013, a specific design gap may be reserved between the first arc-shaped surface 105133 and the surface 101211 of the first protrusion, and/or between the second arc-shaped surface 105134 and the slot surface 101111 of the first arc-shaped slot.

In some other possible embodiments of the present disclosure, a movement track of the first connector 10513 in the process in which the electronic device changes from the unfolded state to the folded state may be different from a movement track of the first connector 10513 in the process in which the electronic device changes from the folded state to the unfolded state. During specific implementation, in the process in which the electronic device changes from the unfolded state to the folded state, the first arc-shaped surface 105133 abuts against the surface 101211 of the first protrusion, and there is a gap between the second arc-shaped surface 105134 and the slot surface 101111 of the first arc-shaped slot. In addition, in the process in which the electronic device changes from the unfolded state to the folded state, the second arc-shaped surface 105134 abuts against the slot surface 101111 of the first arc-shaped slot, and there is a gap between the first arc-shaped surface 105133 and the surface 101211 of the first protrusion. In this embodiment, the surface 101211 of the first protrusion may be non-equidistant from the slot surface 101111 of the first arc-shaped slot, and in this case, the first track slot 1013 may be a non-equal-width slot.

It can be learned from the foregoing descriptions that, in the present disclosure, the first swing arm 10511 may be rotatably connected to the main shaft 101, and the first swing arm 10511 may be rotatably connected to the main shaft 101 in a virtual shaft manner. This can help reduce space occupied by the first swing arm 10511 on the main shaft 101, to help reduce a volume of the rotating module 105, and implement a compact design for the hinge mechanism 1. In addition, it may be understood that, for the outward folding electronic device, when the first swing arm 10511 is rotatably connected to the main shaft 101 in a virtual shaft manner, an axis center at which the first swing arm 10511 rotates around the main shaft 101 is located on one side that is of the main shaft 101 and that is away from the flexible display.

Figure 15:
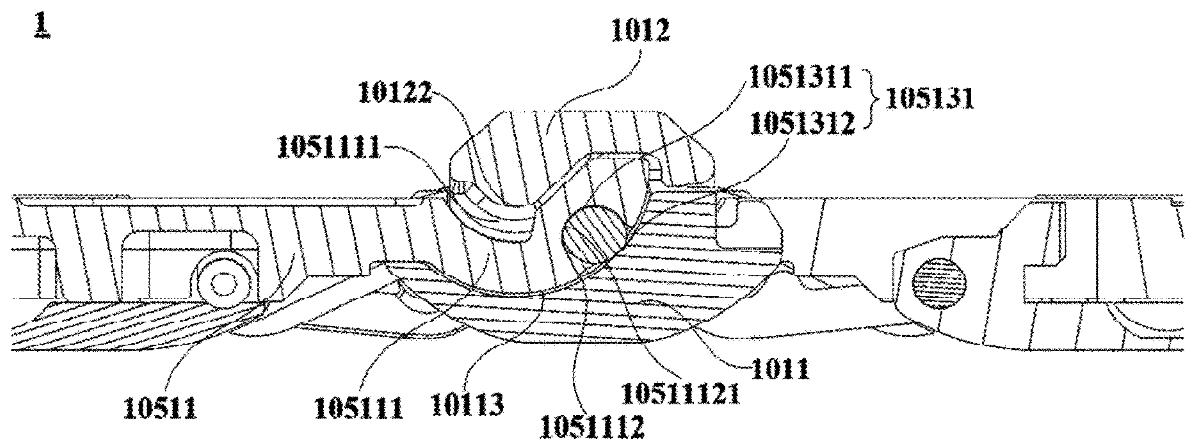
FIG. 15 is a B-B sectional view of the hinge mechanism shown in FIG. 3.

It should be noted that, in the present disclosure, the virtual shaft is an axis center of a circular-arc-shaped structure. Two components that are rotatably connected are capable of rotating relative to the virtual shaft, and a position of the virtual shaft is fixed as the two components that are rotatably connected rotate relative to each other. For example, FIG. 15 is a B-B sectional view of the hinge mechanism 1 shown in FIG. 3. A first arc-shaped rotating block 105111 may be disposed at an end that is of the first swing arm 10511 and that faces the base 1011. In addition, refer to FIG. 10. The base 1011 may be provided with a second arc-shaped slot 10112. The first arc-shaped rotating block 105111 may be accommodated in the second arc-shaped slot 10112, and the first arc-shaped rotating block 105111 is capable of sliding along the slot surface of the second arc-shaped slot 10112. In this way, the rotation of the first swing arm 10511 around the main shaft 101 is implemented through sliding of the first arc-shaped rotating block 105111 along an arc-shaped surface of the second arc-shaped slot 10112. In addition, in the present disclosure, the first arc-shaped rotating block 105111 may be but is not limited to a circular-arc-shaped rotating block, and the second arc-shaped slot 10112 may be but is not limited to a circular-arc-shaped slot. It may be understood that, when the first arc-shaped rotating block 105111 is a circular-arc-shaped rotating block, a surface that is of the first arc-shaped rotating block 105111 and that is in contact with the slot surface of the second arc-shaped slot 10112 may be a circular arc surface, the slot surface of the second arc-shaped slot 10112 is also a circular arc surface, and centers of the two circular arc surfaces coincide with each other.

Still refer to FIG. 11 and FIG. 15 together. The cover 1012 may include a second protrusion 10122 disposed toward the second arc-shaped slot 10112, at least a part of the first arc-shaped rotating block 105111 is located between the second protrusion 10122 and the second arc-shaped slot 10112, and the first arc-shaped rotating block 105111 may be in contact with a surface 101221 of the second protrusion. In this way, the first arc-shaped rotating block 105111 may be limited between the cover 1012 and the base 1011, and rotation stability of the first arc-shaped rotating block 105111 relative to the base 1011 can be effectively improved.

It should be noted that when the slot surface of the second arc-shaped slot 10112 is a circular arc surface, a part that is of the surface 101221 of the second protrusion and that is in contact with the first arc-shaped rotating block 105111 may also be a circular arc surface, and centers of the two circular arc surfaces coincide with each other. In addition, a surface 101221 that is of the first arc-shaped rotating block 105111 and that faces the second protrusion may be a plane or a circular arc surface, provided that the first arc-shaped rotating block 105111 can rotate relative to the second protrusion 10122.

Figure 16:
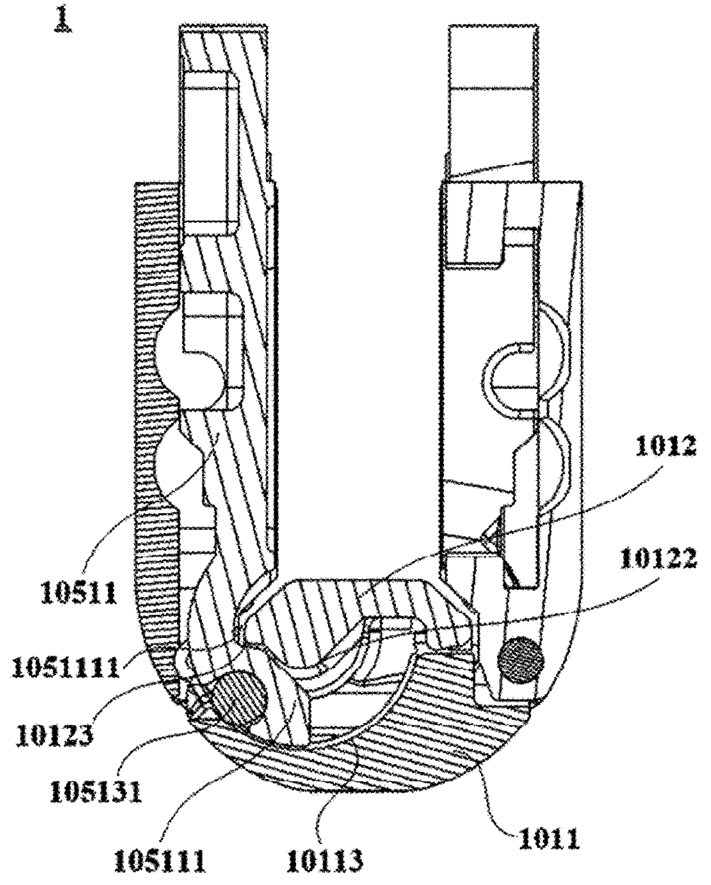
FIG. 16 is a sectional view of a first swing arm of a hinge mechanism when an electronic device is in a folded state according to an embodiment of the present disclosure.

FIG. 16 is a sectional view of the first swing arm 10511 of the hinge mechanism 1 when the electronic device is in the folded state according to an embodiment of the present disclosure. In the present disclosure, the first arc-shaped rotating block 105111 may further be provided with a first recess 1051111, and an opening of the first recess 1051111 is disposed toward the cover 1012. In addition, a first insertion part 10123 may be disposed at an end part that is of the cover 1012 and that faces the first swing arm 10511. In this case, in the folded state, the first insertion part 10123 may be inserted into the first recess 1051111, and a surface that is of the first insertion part 10123 and that faces the second arc-shaped slot 10112 abuts against at least a part of a surface of the first recess 1051111. In this way, a rotation part of the first arc-shaped rotating block 105111 may be limited, and the first arc-shaped rotating block 105111 may be prevented from falling off from the second arc-shaped slot 10112, to improve reliability of a connection between the first swing arm 10511 and the main shaft 101, and improve structural reliability of the entire hinge mechanism 1.

It should be noted that, in the present disclosure, in addition to being rotatably connected to the main shaft 101 in a virtual shaft manner, the first swing arm 10511 may be rotatably connected to the main shaft 101 in a solid shaft manner, so that the first swing arm 10511 can be connected to the main shaft 101 relatively reliably. It may be understood that, when the first swing arm 10511 is connected to the main shaft 101 in a solid shaft manner, an axis center at which the first swing arm 10511 rotates around the main shaft 101 is also located on one side that is of the main shaft 101 and that is away from the flexible display.

In the present disclosure, when the first swing arm 10511 is rotatably connected to the first connector 10513, still refer to FIG. 13. The first connector 10513 may include a first rotating shaft 105131 and a second rotating shaft 105132, and an axis of the first rotating shaft 105131 is parallel to and does not coincide with an axis of the second rotating shaft 105132.

Figure 17:
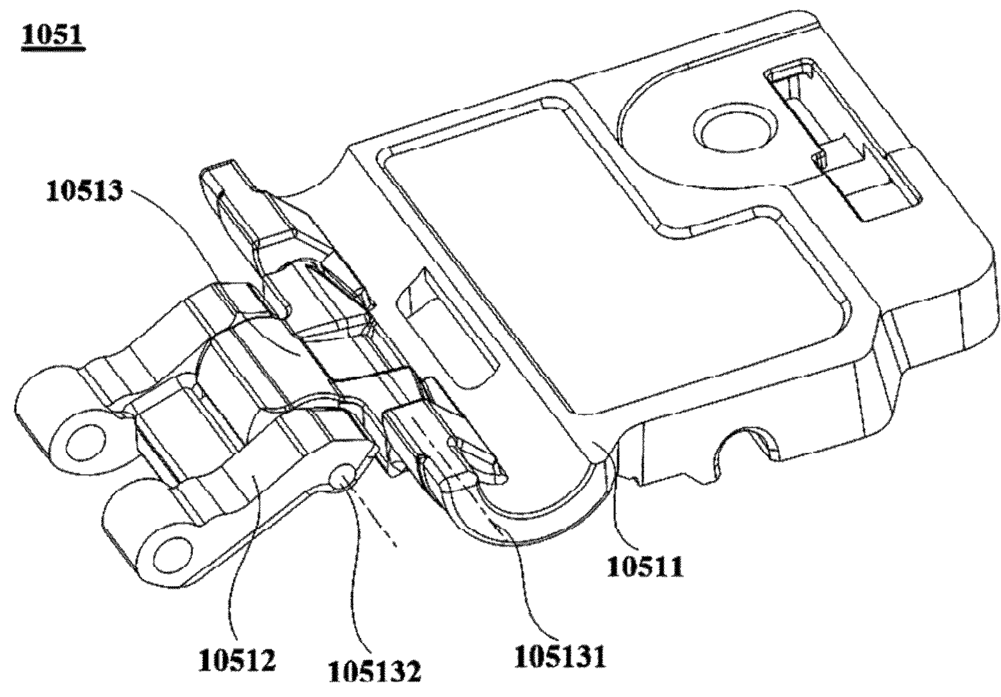
FIG. 17 is a diagram of a structure of a first rotating assembly according to an embodiment of the present disclosure.

In addition, FIG. 17 is a diagram of a structure of the first rotating assembly 1051 according to an embodiment of the present disclosure. The first connector 10513 is rotatably connected to the first swing arm 10511 via the first rotating shaft 105131, and the first connector 10513 is rotatably connected to the first support arm 10512 via the second rotating shaft 105132. In this way, the first swing arm 10511 and the first support arm 10512 may perform mutual pulling movement via the first connector 10513.

Figure 18:
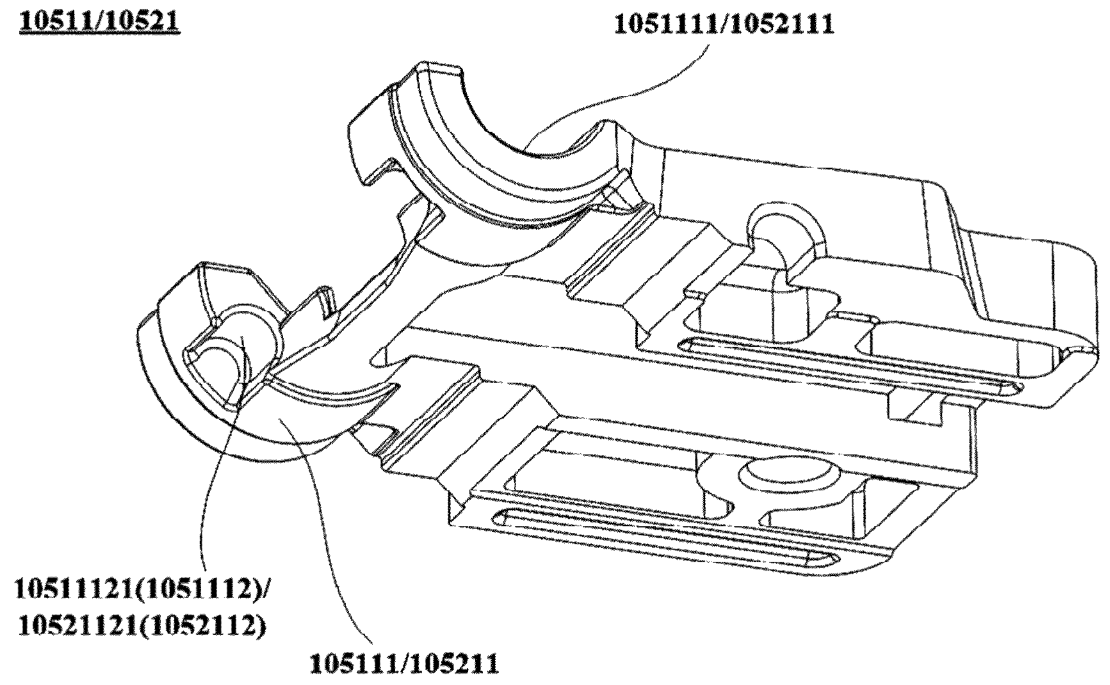
FIG. 18 is a diagram of a structure of a first swing arm according to an embodiment of the present disclosure.

FIG. 18 is a diagram of a structure of the first swing arm 10511 according to an embodiment of the present disclosure. The first arc-shaped rotating block 105111 of the first swing arm 10511 is provided with a first mounting slot 1051112. A slot opening of the first mounting slot 1051112 is disposed toward the second arc-shaped slot 10112, and the first rotating shaft 105131 may be mounted in the first mounting slot 1051112. A part of a surface of the first rotating shaft 105131 may be in contact with a slot surface of the first mounting slot 1051112, and a part of the surface of the first rotating shaft 105131 is in contact with the slot surface of the second arc-shaped slot 10112, to limit the first rotating shaft 105131 to the first mounting slot 1051112.

Still refer to FIG. 15 and FIG. 18. The slot surface of the first mounting slot 1051112 may include a first circular arc surface 10511121, the surface that is of the first rotating shaft 105131 and that is in contact with the slot surface of the first mounting slot 1051112 is a second circular arc surface 1051311, and a center of the first circular arc surface 10511121 coincides with a center of the second circular arc surface 1051311. In addition, refer to FIG. 10. The slot surface of the second arc-shaped slot 10112 may be a third circular arc surface 101121. However, as shown in FIG. 13, the surface that is of the first rotating shaft 105131 and that is in contact with the slot surface of the second arc-shaped slot 10112 may be a fourth circular arc surface 1051312, and a center of the third circular arc surface 101121 coincides with a center of the fourth circular arc surface 1051312. In this way, refer to FIG. 15 and FIG. 16 together. When the first rotating shaft 105131 slides along the slot surface of the second arc-shaped slot 10112 with the first arc-shaped rotating block 105111, the first rotating shaft 105131 may further rotate relative to the first arc-shaped rotating block 105111, to help implement movement of the first connector 10513 relative to the main shaft 101.

It should be noted that, when the first swing arm 10511 is rotatably connected to the main shaft 101 via the first arc-shaped rotating block 105111, the first connecting rod 10212 of the first gear assembly 1021 in the synchronization assembly 102 may be rotatably connected to the first arc-shaped rotating block 105111. During specific implementation, the first arc-shaped rotating block 105111 may be provided with a first jack, so that the first rod part 102122 of the first connecting rod 10212 may be inserted into the first jack, and the first rod part 102122 may rotate relative to the first arc-shaped rotating block 105111 in the first jack. This can effectively reduce a size of the hinge mechanism 1, to help implement a compact design for the hinge mechanism 1.

In the present disclosure, when the first connector 10513 is rotatably connected to the first support arm 10512, as shown in FIG. 17, the second rotating shaft 105132 may penetrate both the first connector 10513 and the first support arm 10512. In this case, a connection manner of the first connector 10513 and the first support arm 10512 is relatively simple, which helps simplify a structure of the first rotating assembly 1051, so that a structure of the hinge mechanism 1 can be simplified. It should be noted that, when both the first arc-shaped surface 105133 and the second arc-shaped surface 105134 are circular arc surfaces, the center of the first arc-shaped surface 105133, the center of the second arc-shaped surface 105134, and an axis center of the second rotating shaft 105132 coincide with each other.

It may be understood that, in the hinge mechanism 1 provided in embodiments of the present disclosure, the first connector 10513 includes a plurality of first connectors 10513 that are sequentially rotatably connected. In addition, the plurality of first sub-connectors may be located between the first swing arm 10511 and the first support arm 10512, the first swing arm 10511 may be rotatably connected to a first sub-connector adjacent to the first swing arm 10511, and the first support arm 10512 may be rotatably connected to a first sub-connector adjacent to the first support arm 10512. For a manner in which the first swing arm 10511 is rotatably connected to the first sub-connector adjacent to the first swing arm 10511 and a manner in which the first support arm 10512 is rotatably connected to the first sub-connector adjacent to the first support arm 10512, refer to the foregoing descriptions of the rotatable connection of the first swing arm 10511 and the first support arm 10512 to the first connector 10513. In the present disclosure, the first connector 10513 is set as the plurality of first sub-connectors that are sequentially rotatably connected, so that the first swing arm 10511 and the first support arm 10512 are connected via the plurality of first sub-connectors. This can effectively improve speed uniformity in a process in which the first swing arm 10511 and the first support arm 10512 rotate around the main shaft 101, thereby improving smoothness of mutual pulling movement of the first swing arm 10511 and the first support arm 10512.

Still refer to FIG. 4. In the present disclosure, the first swing arm 10511 may be further slidably connected to the first housing mounting bracket 103, so that the first swing arm 10511 may rotate around the main shaft 101 to drive the first housing mounting bracket 103 to rotate along a same direction. During specific implementation, the first housing mounting bracket 103 is provided with a first sliding groove 1031. The first sliding groove 1031 extends along a first direction, and the first swing arm 10511 may be mounted in the first sliding groove 1031 and is capable of sliding along the first direction in the first sliding groove 1031. The first direction may be a direction along which the first housing mounting bracket 103 moves toward or away from the base 1011. In addition, to prevent the first swing arm 10511 from falling off from the first sliding groove 1031, a first sliding rail may be disposed on a sliding groove wall of the first sliding groove 1031, and a first sliding block may be disposed on the first swing arm 10511. In this way, the first sliding block may be clamped on the first sliding rail, and the first sliding block is capable of sliding along the first sliding rail, to limit the first swing arm 10511 to the first sliding groove 1031. In addition, the first sliding rail is disposed on the sliding groove wall of the first sliding groove 1031, which may provide guidance for sliding of the first swing arm 10511 along the first sliding groove 1031, to improve movement stability of the first swing arm 10511.

In the present disclosure, the first support arm 10512 may be rotatably connected to the second housing mounting bracket 104. During specific implementation, still refer to FIG. 4. The second housing mounting bracket 104 is provided with a second mounting part 1042. An end part that is of the first support arm 10512 and that faces the second housing mounting bracket 104 is mounted on the second mounting part 1042, and an end part that is of the first support arm 10512 and that faces the second housing mounting bracket 104 is rotatably connected to the second mounting part 1042.

In embodiments of the present disclosure, a specific manner in which the end part that is of the first support arm 10512 and that faces the second housing mounting bracket 104 is rotatably connected to the second mounting part 1042 is not limited. For example, still refer to FIG. 4. The second mounting part 1042 may be provided with a first mounting hole, and a second mounting hole is disposed at the end part that is of the first support arm 10512 and that faces the second housing mounting bracket 104. In this case, an end part that is of the first support arm 10512 and that faces the first housing mounting bracket 103 may be rotatably connected to the second mounting part 1042 via a rotating shaft that penetrates both the first mounting hole and the second mounting hole.

Figure 19:
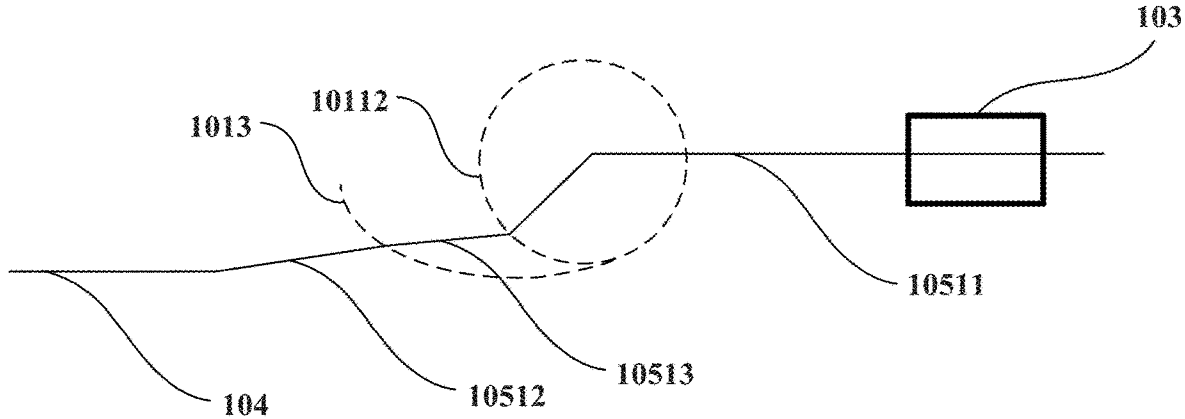
FIG. 19 is a diagram of a principle of a movement mechanism of a hinge mechanism according to an embodiment of the present disclosure.

FIG. 19 is a diagram of a principle of a movement mechanism of the hinge mechanism 1 according to an embodiment of the present disclosure. Based on the hinge mechanism 1 provided in the foregoing embodiments of the present disclosure, in the process in which the electronic device changes from the unfolded state to the folded state, the first housing mounting bracket 103 and the second housing mounting bracket 104 move toward each other. When the first housing mounting bracket 103 drives the first swing arm 10511 to rotate around the main shaft 101 clockwise, the first swing arm 10511 is capable of sliding along the slot surface of the second arc-shaped slot 10112, so that the first connector 10513 may be driven to move toward the first swing arm 10511 in the first track slot 1013 of the main shaft 101. In addition, because the first connector 10513 is rotatably connected to the first support arm 10512, in a process in which the first connector 10513 moves toward the first swing arm 10511 in the first track slot 1013 of the main shaft 101, the first support arm 10512 may be driven to rotate around the main shaft 101 counter-clockwise, so that the first support arm 10512 drives the second housing mounting bracket 104 to rotate around the main shaft 101 counter-clockwise. In the process in which the electronic device changes from the folded state to the unfolded state, the first housing mounting bracket 103 and the second housing mounting bracket 104 move away from each other. When the first housing mounting bracket 103 drives the first swing arm 10511 to rotate around the main shaft 101 counter-clockwise, the first swing arm 10511 may drive the first connector 10513 to move toward the first support arm 10512 in the first track slot 1013 of the main shaft 101, and the first support arm 10512 may be driven to rotate around the main shaft 101 clockwise, so that the first support arm 10512 drives the second housing mounting bracket 104 to rotate around the main shaft 101 clockwise. This implements folding and unfolding functions of the hinge mechanism 1.

Some existing hinge mechanisms need to thicken a rotating assembly connected to a main shaft to ensure stability of the mechanisms. In this way, both the main shaft and the hinge mechanism are very heavy. If the main shaft and the hinge mechanism are forcibly thinned, strength of the rotating assembly is easily weakened, thereby greatly affecting reliability of the hinge mechanisms and shortening a life of the electronic device. The hinge mechanism 1 in the present disclosure has a simplified structure. According to the foregoing structural relationship, the first connector 10513 may be manufactured with a relatively small cross section to travel back and forth in the first track slot 1013 of the main shaft 101. In addition, the first connector 10513 has a sufficient length extension along a vertical axial direction, and separately has a connection relationship with the first swing arm 10511 and the first support arm 10512, so that reliability of the hinge mechanism 1 can be ensured. In this way, the thickness of the main shaft 101 and the thickness of the entire electronic device can be reduced, and reliability of the hinge mechanism 1 can be maintained, so that the entire hinge mechanism 1 is light, thin, and reliable.

In addition, because the first connector 10513 is capable of moving in the first track slot 1013 according to a specified track, uncontrolled movement of the first connector 10513 in an entire folding and unfolding process can be avoided, and random movement of the first housing mounting bracket 103 and the second housing mounting bracket 104 can further be avoided, to ensure structural stability and movement stability of the entire hinge mechanism 1. In some cases, the first track slot 1013 is appropriately designed, so that an outer tangent line of the hinge mechanism 1 can keep a constant length in the entire folding and unfolding process, and the flexible display covering the surface of the hinge mechanism I can also basically keep a length unchanged. In this way, squeezing or pulling on the flexible display can be effectively avoided, to improve structural reliability of the flexible display and further improve structural reliability of the electronic device.

Still refer to FIG. 4. Similarly structured as the first rotating assembly 1051, the second rotating assembly 1052 is set to be located between the first housing mounting bracket 103 and the second housing mounting bracket 104. Furthermore, in addition to including the second swing arm 10521, the second rotating assembly 1052 may further include a second support arm 10522 and a second connector 10523. The second connector 10523 is located between the second swing arm 10521 and the second support arm 10522, the second connector 10523 is rotatably connected to the second swing arm 10521, and the second connector 10523 is rotatably connected to the second support arm 10522. In the present disclosure, the second connector 10523 may be rotatably connected to the second swing arm 10521 and the first support arm 10512 with reference to how the first connector 10513 is rotatably connected to the second swing arm 10521 and the second support arm 10522. For example, refer to FIG. 13. FIG. 13 may also be used to indicate a structure of the second connector 10523 according to this embodiment of the present disclosure. The second connector 10523 may include a third rotating shaft 105231 and a fourth rotating shaft 105232, and an axis of the third rotating shaft 105231 is parallel to and does not coincide with an axis of the fourth rotating shaft 105232. The second connector 10523 may be rotatably connected to the second swing arm 10521 via the third rotating shaft 105231, and the second connector 10523 may be rotatably connected to the second support arm 10522 via the fourth rotating shaft 105232, so that the second swing arm 10521 and the second support arm 10522 perform mutual pulling movement via the second connector 10523.

In addition, refer to FIG. 9. The main shaft 101 may be provided with a second track slot 1014, and the second connector 10523 is capable of moving along the second track slot 1014, for limitation on a movement track of the second connector 10523. In practice, refer to FIG. 10. The base 1011 may be provided with a third arc-shaped slot 10113, the second connector 10523 is accommodated in the third arc-shaped slot 10113, and the second connector 10523 is capable of sliding along a slot surface of the third arc-shaped slot 10113. In addition, refer to FIG. 11. The cover 1012 includes a third protrusion 10124. The third protrusion 10124 may be disposed toward the third arc-shaped slot 10113. A gap exists between a surface 101241 of the third protrusion and the slot surface 101131 of the third arc-shaped slot, and the gap is used as the second track slot 1014.

In the present disclosure, as shown in FIG. 13, the second connector 10523 may include a third arc-shaped surface 105233 and a fourth arc-shaped surface 105234. When the electronic device is in the unfolded state and the folded state, the third arc-shaped surface 105233 of the second connector 10523 may abut against the surface 101241 of the third protrusion, and the fourth arc-shaped surface 105234 abuts against the slot surface 101131 of the third arc-shaped slot. In this way, the surface 101241 of the third protrusion and the slot surface 101131 of the third arc-shaped slot limit the second connector 10523 to the second track slot 1014, so that when the hinge mechanism 1 is in the unfolded state and the folded state, the second connector 10523 is relatively stable without any gap-caused shake, and structural reliability of the hinge mechanism 1 is improved in the foregoing two states.

In this embodiment of the present disclosure, the third arc-shaped surface 105233 of the second connector 10523 may be disposed with reference to the first arc-shaped surface 105133 of the first connector 10513, and the fourth arc-shaped surface 105234 may be disposed with reference to the second arc-shaped surface 105134 of the first connector 10513. In addition, the second track slot 1014 may be set with reference to the first track slot 1013. Simply speaking, spacings between the surface 101241 of the third protrusion and the slot surface 101131 of the third arc-shaped slot are equal, so that the second track slot 1014 is an equal-width slot. In this case, in the processes in which the electronic device changes from the unfolded state to the folded state and from the folded state to the unfolded state, the surface 101241 of the third protrusion keeps an abut-against state with the third arc-shaped surface 105233, and the slot surface 101131 of the third arc-shaped slot keeps an abut-against state with the fourth arc-shaped surface 105234. Therefore, in the processes in which the electronic device changes from the unfolded state to the folded state and from the folded state to the unfolded state, movement tracks of the second connector 10523 in the second track slot 1014 are the same. Alternatively, in the process in which the electronic device changes from the unfolded state to the folded state, the third arc-shaped surface 105233 abuts against the surface 101241 of the third protrusion, and a gap exists between the fourth arc-shaped surface 105234 and the slot surface 101131 of the third arc-shaped slot. In the process in which the electronic device changes from the folded state to the unfolded state, the fourth arc-shaped surface 105234 abuts against the slot surface 101131 of the third arc-shaped slot, and a gap exists between the third arc-shaped surface 105233 and the surface 101241 of the third protrusion. In this way, a movement track of the second connector 10523 in the process in which the electronic device changes from the unfolded state to the folded state is different from a movement track of the second connector 10523 in the process in which the electronic device changes from the folded state to the unfolded state.

In the present disclosure, the second swing arm 10521 is rotatably connected to the main shaft 101. The second swing arm 10521 and the main shaft 101 may be rotatably connected in a virtual shaft manner. In practice, refer to FIG. 10. The base 1011 may be provided with a fourth arc-shaped slot 10114. In addition, refer to FIG. 4 and FIG. 18. FIG. 18 may also show a structure of the second swing arm 10521. A second arc-shaped rotating block 105211 is disposed at an end that is of the second swing arm 10521 and that faces the base 1011. The second arc-shaped rotating block 105211 may be but is not limited to a circular-arc-shaped rotating block, and the fourth arc-shaped slot 10114 may be but is not limited to a circular-arc-shaped slot. The second arc-shaped rotating block 105211 may be accommodated in the fourth arc-shaped slot 10114, and is capable of sliding along the slot surface of the fourth arc-shaped slot 10114. In this way, the rotation of the second swing arm 10521 around the base 1011 is implemented through sliding of the second arc-shaped rotating block 105211 along the slot surface of the fourth arc-shaped slot 10114. This can help reduce space occupied by the second swing arm 10521 on the main shaft 101, to help reduce a volume of the rotating module 105, and implement a compact design for the hinge mechanism 1. It may be understood that, for the outward folding electronic device, when the second swing arm 10521 is rotatably connected to the main shaft 101 in a virtual shaft manner, an axis center at which the second swing arm 10521 rotates around the main shaft 101 is located on one side that is of the hinge mechanism 1 and that is away from the flexible display.

In addition, in the present disclosure, the second arc-shaped rotating block 105211 may be but is not limited to a circular-arc-shaped rotating block, and the fourth arc-shaped slot 10114 may be but is not limited to a circular-arc-shaped slot. It may be understood that, when the second arc-shaped rotating block 105211 is a circular-arc-shaped rotating block, a surface that is of the second arc-shaped rotating block 105211 and that is in contact with the slot surface of the fourth arc-shaped slot 10114 may be a circular arc surface, the slot surface of the fourth arc-shaped slot 10114 is also a circular arc surface, and centers of the two circular arc surfaces coincide with each other.

In the present disclosure, to improve stability of rotation of the second swing arm 10521 around the main shaft 101, as shown in FIG. 11, the cover 1012 further includes a fourth protrusion 10125 disposed toward the fourth arc-shaped slot 10114, at least a part of the second arc-shaped rotating block 105211 is located between the fourth protrusion 10125 and the fourth arc-shaped slot 10114, and a surface that is of the second arc-shaped rotating block 105211 and that faces the fourth protrusion 10125 may be in contact with a surface 101251 of the fourth protrusion. In this way, the second arc-shaped rotating block 105211 may be limited between the cover 1012 and the base 1011, and rotation stability of the second arc-shaped rotating block 105211 relative to the base 1011 can be effectively improved. In addition, when the slot surface of the fourth arc-shaped slot 10114 is a circular arc surface, a part that is of the surface 101251 of the fourth protrusion and that is in contact with the second arc-shaped rotating block 105211 may also be a circular arc surface, and centers of the two circular arc surfaces coincide with each other. In the present disclosure, a surface that is of the second arc-shaped rotating block 105211 and that faces the fourth protrusion 10125 may be a plane or a circular arc surface, provided that the second arc-shaped rotating block 105211 can rotate relative to the fourth protrusion 10125 in a process in which the second arc-shaped rotating block 105211 slides along the slot surface of the fourth arc-shaped slot 10114.

To improve reliability of a connection between the second swing arm 10521 and the base 1011, the second arc-shaped rotating block 105211 may further be provided with a second recess 1052111, and an opening of the second recess 1052111 is disposed toward the cover 1012. In addition, a second sliding part 102221 (not shown in FIG. 4) may be disposed at an end part that is of the cover 1012 and that faces the second housing mounting bracket 104. In this case, in the folded state, the second sliding part 102221 may be inserted into the second recess 1052111, and a surface that is of the second sliding part 102221 and that faces the fourth arc-shaped slot 10114 abuts against at least a part of a surface of the second recess 1052111. In this way, a rotation part of the second arc-shaped rotating block 105211 may be limited, and the second arc-shaped rotating block 105211 may be prevented from falling off from the fourth arc-shaped slot 10114.

It should be noted that, in the present disclosure, in addition to being rotatably connected to the main shaft 101 in a virtual shaft manner, the second swing arm 10521 may be rotatably connected to the main shaft 101 in a solid shaft manner, so that the first swing arm 10511 can be connected to the main shaft 101 relatively reliably. For the outward folding electronic device, when the second swing arm 10521 is rotatably connected to the main shaft 101 in a solid shaft manner, an axis center at which the second swing arm 10521 rotates around the main shaft 101 is also located on one side that is of the hinge mechanism and that is away from the flexible display.

Specifically, when the second connector 10523 is rotatably connected to the second swing arm 10521 via the third rotating shaft 105231, as shown in FIG. 18, the second arc-shaped rotating block 105211 is provided with a second mounting slot 1052112, and a slot opening of the second mounting slot 1052112 is disposed toward the fourth arc-shaped slot 10114. In this case, the third rotating shaft 105231 may be mounted in the second mounting slot 1052112, a part of the surface of the third rotating shaft 105231 may be in contact with a slot surface of the second mounting slot 1052112, and a part of the surface of the third rotating shaft 105231 is in contact with the slot surface of the fourth arc-shaped slot 10114, to limit the third rotating shaft 105231 to the second mounting slot 1052112.

As shown in FIG. 18, in the present disclosure, the slot surface of the second mounting slot 1052112 may include a fifth circular arc surface 10521121. As shown in FIG. 13, the surface that is of the third rotating shaft 105231 and that is in contact with the slot surface of the second mounting slot 1052112 is a sixth circular arc surface 1052311, and a center of the fifth circular arc surface 10521121 coincides with a center of the sixth circular arc surface 1052311. In addition, the slot surface of the fourth arc-shaped slot 10114 is a seventh circular arc surface 101141, the surface that is of the third rotating shaft 105231 and that is in contact with the slot surface of the fourth arc-shaped slot 10114 may be an eighth circular arc surface 1052312, and a center of the seventh circular arc surface 101141 coincides with a center of the eighth circular arc surface 1052312. In this way, when the third rotating shaft 105231 slides along the slot surface of the fourth arc-shaped slot 10114 with the second arc-shaped rotating block 105211, the third rotating shaft 105231 may further rotate relative to the second arc-shaped rotating block 105211, to help implement movement of the second connector 10523 relative to the main shaft 101.

It should be noted that, when the second swing arm 10521 is rotatably connected to the main shaft 101 via the second arc-shaped rotating block 105211, the second connecting rod 10222 of the second gear assembly 1022 in the synchronization assembly 102 may be rotatably connected to the second arc-shaped rotating block 105211. During specific implementation, the second arc-shaped rotating block 105211 may be provided with a second jack, so that the second rod part 102222 of the second connecting rod 10222 may be inserted into the second jack, and the second rod part 102222 may rotate relative to the second arc-shaped rotating block 105211 in the second jack. This can effectively reduce a size of the hinge mechanism 1, to help implement a compact design for the hinge mechanism 1.

In embodiments of the present disclosure, specifically, when the second connector 10523 is rotatably connected to the second support arm 10522 via the fourth rotating shaft 105232, the fourth rotating shaft 105232 may penetrate the second connector 10523 and the second support arm 10522 at the same time. In this case, a connection manner of the second connector 10523 and the second support arm 10522 is relatively simple, which helps simplify a structure of the second rotating assembly 1052, so that a structure of the hinge mechanism 1 can be simplified.

It may be understood that, in the hinge mechanism 1 provided in embodiments of the present disclosure, the second connector 10523 may include a plurality of second sub-connectors that are sequentially rotatably connected. In addition, the plurality of second sub-connectors may be located between the second swing arm 10521 and the second support arm 10522. In this case, the second swing arm 10521 may be rotatably connected to an adjacent second sub-connector. For a manner in which the second swing arm 10521 is rotatably connected to the adjacent second sub-connector and a manner in which the second support arm 10522 is rotatably connected to the adjacent second sub-connector, refer to the foregoing descriptions of the rotatable connection of the second swing arm 10521 and the second support arm 10522 to the second connector 10523. In the present disclosure, the second connector 10523 is set as the plurality of second sub-connectors that are sequentially rotatably connected, so that the second swing arm 10521 and the second support arm 10522 are rotatably connected via the plurality of second sub-connectors. This can effectively improve speed uniformity in a process in which the second swing arm 10521 and the second support arm 10522 rotate around the main shaft 101, thereby improving smoothness of mutual pulling movement of the second swing arm 10521 and the second support arm 10522.

In the present disclosure, the second swing arm 10521 may be slidably connected to the second housing mounting bracket 104, and the second swing arm 10521 rotates around the main shaft 101 to drive the second housing mounting bracket 104 to rotate along a same direction. In addition, because the first swing arm 10511 and the second swing arm 10521 are connected via the synchronization assembly 102 in a transmission manner, when the first swing arm 10511 and the second swing arm 10521 synchronously rotate toward each other or away from each other, the first housing mounting bracket 103 and the second housing mounting bracket 104 may synchronously rotate toward each other or away from each other.

When the second swing arm 10521 may be slidably connected to the second housing mounting bracket 104 specifically, the second housing mounting bracket 104 is provided with a second sliding groove 1041. The second sliding groove 1041 and the second mounting part 1042 are disposed at a spacing along the length direction of the hinge mechanism 1. The second sliding groove 1041 extends along a second direction, and the second swing arm 10521 may be mounted in the second sliding groove 1041 and is capable of sliding along the second direction in the second sliding groove 1041. The second direction may be a direction along which the second housing mounting bracket 104 moves toward or away from the base 1011. In addition, to prevent the second swing arm 10521 from falling off from the second sliding groove 1041, a second sliding rail may be disposed on a sliding groove wall of the second sliding groove 1041, and a second sliding block may be disposed on the second swing arm 10521. In this way, the second sliding block may be clamped on the second sliding rail, and the second sliding block is capable of sliding along the second sliding rail, to limit the second swing arm 10521 to the second sliding groove 1041. In addition, the second sliding rail is disposed on the sliding groove wall of the second sliding groove 1041, which may provide guidance for sliding of the second swing arm 10521 along the second sliding groove 1041, to improve movement stability of the second swing arm 10521.

In addition, the second support arm 10522 may be rotatably connected to the first housing mounting bracket 103. During specific implementation, the first housing mounting bracket 103 is provided with a first mounting part 1032. Along the length direction of the hinge mechanism 1, the first mounting part 1032 and the third sliding groove are disposed at a spacing. An end part that is of the second support arm 10522 and that faces the first housing mounting bracket 103 is mounted on the first mounting part 1032, and an end part that is of the second support arm 10522 and that faces the first housing mounting bracket 103 is rotatably connected to the first mounting part 1032.

In embodiments of the present disclosure, a specific manner in which the end part that is of the second support arm 10522 and that faces the first housing mounting bracket 103 is rotatably connected to the first mounting part 1032 is not limited. For example, still refer to FIG. 4. The first mounting part 1032 may be provided with a third mounting hole, and a fourth mounting hole is disposed at an end part that is of the second support arm 10522 and that faces the first housing mounting bracket 103. In this case, the end part that is of the second support arm 10522 and that faces the first housing mounting bracket 103 may be rotatably connected to the first mounting part 1032 via a rotating shaft that penetrates both the third mounting hole and the fourth mounting hole.

Based on the hinge mechanism 1 provided in the foregoing embodiments of the present disclosure, in the process in which the electronic device changes from the unfolded state to the folded state, the first housing mounting bracket 103 and the second housing mounting bracket 104 move toward each other. When the second housing mounting bracket 104 drives the second swing arm 10521 to rotate around the main shaft 101 counter-clockwise, the second swing arm 10521 may drive the second connector 10523 to move toward the second swing arm 10521 in the second track slot 1014 of the main shaft 101. In addition, because the second connector 10523 is rotatably connected to the second support arm 10522, in the process in which the second connector 10523 moves toward the second swing arm 10521 in the second track slot 1014 of the main shaft 101, the second support arm 10522 may be driven to rotate around the main shaft 101 clockwise, so that the second support arm 10522 drives the first housing mounting bracket 103 to rotate around the main shaft 101 clockwise. In the process in which the electronic device changes from the folded state to the unfolded state, the first housing mounting bracket 103 and the second housing mounting bracket 104 move away from each other. When the second housing mounting bracket 104 drives the second swing arm 10521 to rotate around the main shaft 101 clockwise, the second swing arm 10521 may drive the second connector 10523 to move toward the second support arm 10522 in the second track slot 1014 of the main shaft 101, and the second support arm 10522 may be driven to rotate around the main shaft 101 counter-clockwise, so that the second support arm 10522 drives the first housing mounting bracket 103 to rotate around the main shaft 101 counter-clockwise. In this way, folding and unfolding functions of the hinge mechanism 1 are implemented.

Some existing hinge mechanisms need to thicken a rotating assembly connected to a main shaft to ensure stability of the mechanisms. In this way, both the main shaft and the hinge mechanism are very heavy. If the main shaft and the hinge mechanism are forcibly thinned, strength of the rotating assembly is easily weakened, thereby greatly affecting reliability of the hinge mechanisms and shortening a life of the electronic device. The hinge mechanism 1 in the present disclosure has a simplified structure. According to the foregoing structural relationship, the second connector 10523 may be manufactured with a relatively small cross section to travel back and forth in the second track slot 1014 of the main shaft 101. In addition, the second connector 10523 has a sufficient length extension along a vertical axial direction, and separately has a connection relationship with the second swing arm 10521 and the second support arm 10522, so that reliability of the hinge mechanism I can be ensured. In this way, the thickness of the main shaft 101 and the thickness of the entire electronic device can be reduced, and reliability of the hinge mechanism 1 can be maintained, so that the entire hinge mechanism 1 is light, thin, and reliable.

Because the second connector 10523 is capable of moving according to a specified track, uncontrolled movement of the second connector 10523 in an entire folding and unfolding process can be avoided, and random movement of the first housing mounting bracket 103 and the second housing mounting bracket 104 can further be avoided, to ensure structural stability and movement stability of the entire hinge mechanism 1. In some cases, the second track slot 1014 is appropriately designed, so that an outer tangent line of the hinge mechanism 1 can keep a constant length in the entire folding and unfolding process, and the flexible display covering the surface of the hinge mechanism 1 can also basically keep a length unchanged. In this way, squeezing or pulling on the flexible display can be effectively avoided, to improve structural reliability of the flexible display and further improve structural reliability of the electronic device.

Figure 20:
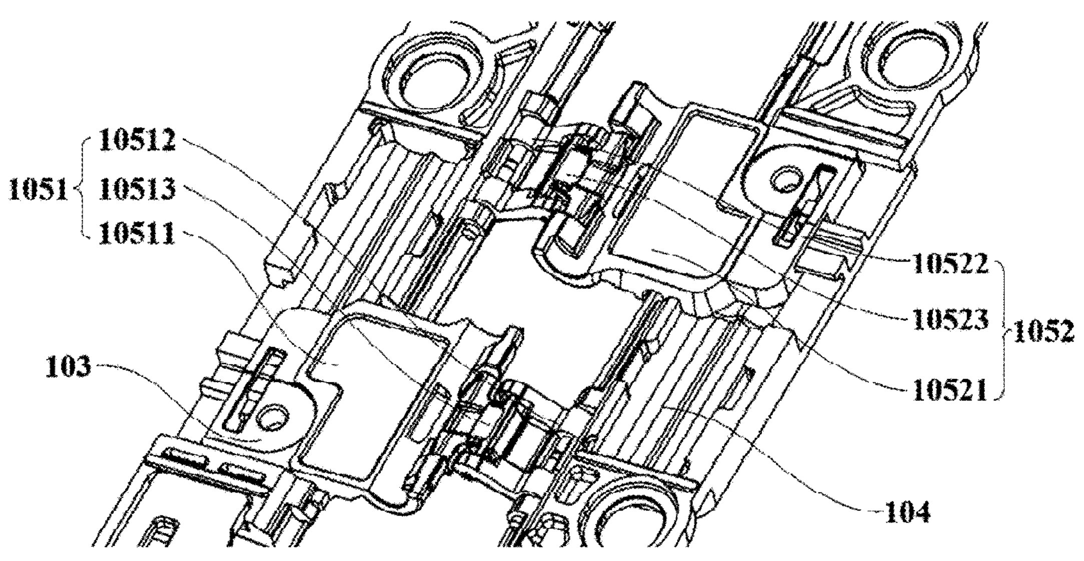
FIG. 20 is a diagram of a partial structure of a hinge mechanism according to an embodiment of the present disclosure.

FIG. 20 is a diagram of a partial structure of the hinge mechanism 1 according to an embodiment of the present disclosure. The main shaft 101 is omitted in FIG. 20, to help describe a mutual pulling movement relationship between the first rotating assembly 1051 and the second rotating assembly 1052. In the present disclosure, the first swing arm 10511 is slidably connected to the first housing mounting bracket 103, the first support arm 10512 is rotatably connected to the second housing mounting bracket 104, and the first swing arm 10511 may pull, via the first connector 10513, the first support arm 10512 to move according to a specified track; and the second swing arm 10521 is slidably connected to the second housing mounting bracket 104, the second support arm 10522 is rotatably connected to the first housing mounting bracket 103, and the second swing arm 10521 may pull, via the second connector 10523, the second support arm 10522 to move according to a specified track. This can limit movement distances of the first housing mounting bracket 103 and the second housing mounting bracket 104 toward or away from the main shaft 101, so that when the electronic device is in any folding state, a distance between the first housing mounting bracket 103 and the main shaft 101 is equal to a distance between the second housing mounting bracket 104 and the main shaft 101. In addition, in the processes in which the electronic device changes from the unfolded state to the folded state and from the folded state to the unfolded state, the first housing mounting bracket 103 is capable of moving at an equal distance relative to the main shaft 101, and the second housing mounting bracket 104 is capable of moving at an equal distance relative to the main shaft 101. In this way, when the hinge mechanism 1 may be used in the electronic device shown in FIG. 2B, an extension length of a support surface formed by the first housing 2, the second housing 3, and the hinge mechanism 1 in the unfolded state can adapt to a flattening length of the flexible display, and when the electronic device is in the folded state, a folding requirement of the foldable part of the flexible display can be met, so that deformation of the flexible display can be avoided, and squeezing or pulling stress on the flexible display can be reduced, to prolong a service life of the flexible display and improve reliability of the electronic device.

According to the hinge mechanism 1 provided in the present disclosure, a rotation function of the hinge mechanism 1 may be implemented through mutual pulling movement of the swing arms, the support arms, and the connectors. In addition, the two housing mounting brackets may synchronously rotate toward or away from each other by disposing the synchronization assembly 102. In addition, because structures of mechanisms for implementing the rotation function and a synchronization function of the hinge mechanism 1 are simple, the first swing arm 10511 and the second swing arm 10521 for implementing the rotation function of the hinge mechanism 1 may also serve as a driving mechanism for the synchronization function, the structure of the entire hinge mechanism 1 can be effectively simplified, to help implement a compact design for the hinge mechanism 1 and reduce costs of the hinge mechanism 1.

The hinge mechanism 1 provided in the foregoing embodiments of the present disclosure may be used in, for example, the outward folding electronic device shown in FIG. 1 or FIG. 2A. The first housing mounting bracket 103 may be fastened to a housing located on a same side of the main shaft 101, and the second housing mounting bracket 104 may be fastened to another housing. For example, the first housing mounting bracket 103 may be configured to be fastened to the first housing 2 of the electronic device shown in FIG. 2A, and the second housing mounting bracket 104 may be configured to be fastened to the second housing 3 of the electronic device shown in FIG. 2A. In view of this, it may be understood that, a process in which the first housing mounting bracket 103 and the second housing mounting bracket 104 synchronously rotate toward each other or away from each other is a process in which the first housing 2 and the second housing 3 synchronously rotate toward each other or away from each other.

In addition, the flexible display of the electronic device may be fastened to the first housing 2 and the second housing 3, and a connection manner may be but is not limited to bonding. During specific implementation, the flexible display may be bonded to a part of the first support surface 2*a* of the first housing 2, and the flexible display may be bonded to a part of the second support surface 3*a* of the second housing 3. In this way, when the electronic device is in the unfolded state, the bearing surface la of the hinge mechanism 1, the first support surface 2*a* of the first housing 2, and the second support surface 3*a* of the second housing 3 may jointly flatly support the flexible display. Therefore, it can be ensured that a form of the electronic device in the unfolded state is complete. In the process in which the electronic device changes from the unfolded state to the folded state, synchronous rotation of the two housings may drive synchronous rotation of parts that are of the flexible display and that are fastened to the two housings, so that the stress on the flexible display is relatively uniform, to effectively avoid deformation of the flexible display, and reduce a risk of damage to the flexible display.

Figure 21:
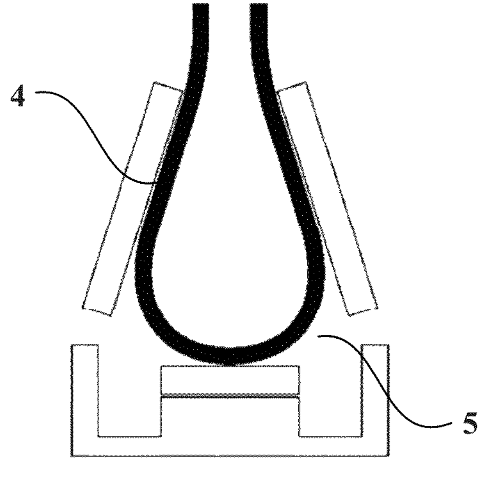
FIG. 21 is a diagram of a structure of an inward folding electronic device in a folded state according to an embodiment of the present disclosure.

It should be noted that the synchronization assembly 102 described in the foregoing embodiments of the present disclosure may be further used in the hinge mechanism 1 of the inward folding electronic device shown in FIG. 21. FIG. 21 is a diagram of a structure of the inward folding electronic device in a folded state according to an embodiment of the present disclosure. In a process in which the electronic device changes from an unfolded state to the folded state, the first housing 2 and the second housing 3 synchronously rotate toward each other, so that parts that are of the flexible display 4 and that are fastened to the two housings can be driven to synchronously rotate. In this way, stress on the flexible display 4 can be relatively uniform, to effectively avoid deformation of the flexible display 4 and reduce a risk of damage to the flexible display 4. In addition, when the electronic device is in the folded state, display adaptation space 5 may be formed at the hinge mechanism 1, and a foldable part of the flexible display may be accommodated in the display adaptation space 5. In addition, in a process in which the electronic device changes from the folded state to the unfolded state, the first housing and the second housing synchronously rotate away from each other, so that parts that are of the flexible display 4 and that are fastened to the two housings can be driven to synchronously rotate. In addition, when the electronic device is in the unfolded state, the bearing surface la of the hinge mechanism 1, the first support surface 2*a* of the first housing 2, and the second support surface 3*a* of the second housing 3 jointly flatly support the flexible display 4. This can ensure a complete form of the electronic device in the unfolded state.

It may be understood that, for the inward folding electronic device, when the first swing arm 10511 and the second swing arm 10521 are rotatably connected to the main shaft 101 via virtual shafts, axis centers at which the first swing arm 10511 and the second swing arm 10521 rotate around the main shaft 101 are located on one side that is of the main shaft 101 and that faces the flexible display. In addition, it should be noted that, when the synchronization assembly 102 is used in the hinge mechanism 1 of the inward folding electronic device, each of the two swing arms may be slidably connected to the corresponding housing mounting bracket, and each of the two swing arms may also be rotatably connected to the corresponding housing mounting bracket via the rotating shafts. Alternatively, each of the two swing arms may also be fixedly connected to the corresponding housing mounting bracket, and a fixed connection manner may be but is not limited to welding, riveting, threaded connection, or the like.

The foregoing descriptions are merely specific implementations of the present disclosure, but are not intended to limit the protection scope of this application. Any variation or replacement readily figured out by a person skilled in the art within the technical scope disclosed in the present disclosure shall fall within the protection scope of this application. Therefore, the protection scope of this application shall be subject to the protection scope of the claims.

What is claimed is:

1. A hinge mechanism configured to be disposed opposite to a foldable part of a flexible display of an electronic device for folding and unfolding the electronic device, wherein the hinge mechanism comprises:

- a main shaft comprising a first side and a second side opposite the first side;
- a first swing arm disposed on the first side and rotatably connected to the main shaft;
- a second swing arm disposed on the second side and rotatably connected to the main shaft; and
- a synchronization assembly located between the first swing arm and the second swing arm along an axial direction of the hinge mechanism, wherein the synchronization assembly comprises:
  - a first gear assembly comprising:
    - a first gear member comprising:
      - a first gear comprising a first gear surface and a first end part, wherein a first axis of the first gear is parallel to and does not coincide with a second axis along which the first swing arm rotates around the main shaft; and a first connection part located on the first end part and facing the first swing arm; and a first connecting rod slidably connected to the first connection part and rotatably connected to the first swing arm; and a second gear assembly comprising:

a second gear member comprising:

a second gear comprising a second gear surface and a second end part, wherein the second gear surface is engaged with the first gear surface, and wherein a third axis of the second gear is parallel to and does not coincide with a fourth axis along which the second swing arm rotates around the main shaft; and a second connection part located on the second end part and facing the second swing arm; and a second connecting rod slidably connected to the second connection part and rotatably connected to the second swing arm.

2. The hinge mechanism of claim 1, wherein the first connection part comprises a first insertion slot, wherein the first connecting rod comprises a first sliding part inserted into the first insertion slot, and wherein the first sliding part is slidable along the first insertion slot wherein the second connection part comprises a second insertion slot, wherein the second connecting rod comprises a second sliding part inserted into the second insertion slot, and wherein the second sliding part is slidable along the second insertion slot.

3. The hinge mechanism of claim 2, wherein the first insertion slot and the second insertion slot are straight line slots, and wherein the first sliding part and the second sliding part are straight line sliding blocks.

4. The hinge mechanism of claim 1, wherein the main shaft further comprises a first track slot and a second track slot, and wherein the hinge mechanism further comprises a rotating member comprising:

a first housing mounting bracket disposed on the first side;

a second housing mounting bracket disposed on the second side;

a first rotating assembly located between the first housing mounting bracket and the second housing mounting bracket, wherein the first rotating assembly comprises:

a first support arm rotatably connected to the second housing mounting bracket;

a first connector located between the first swing arm and the first support arm, wherein the first connector is rotatably connected to the first swing arm and the first support arm and is movable along the first track slot; and a third swing arm rotatably connected to the main shaft and slidably connected to the first housing mounting bracket; and a second rotating assembly located between the first housing mounting bracket and the second housing mounting bracket, wherein the second rotating assembly comprises:

a second support arm rotatably connected to the first housing mounting bracket;

a second connector located between the second swing arm and the second support arm, wherein the second connector is rotatably connected to the second swing arm and the second support arm and is movable along the second track slot; and a second swing arm rotatably connected to the main shaft and slidably connected to the second housing mounting bracket.

5. The hinge mechanism of claim 4, wherein the main shaft comprises:

a base comprising a first arc-shaped slot and a second arc-shaped slot; and a cover covering the base, wherein the cover comprises a first protrusion disposed toward the first arc-shaped slot and a second protrusion disposed toward the second arc-shaped slot, wherein the first track slot comprises a first gap between a first surface of the first protrusion and a first slot surface of the first arc-shaped slot, wherein the first connector comprises a first arc-shaped surface and a second arc-shaped surface, wherein when the electronic device is in an unfolded state and a folded state, the first arc-shaped surface abuts against the first surface, and the second arc-shaped surface abuts against the first slot surface, wherein the second track slot comprises a second gap between a second surface of the second protrusion and a second slot surface of the second arc-shaped slot, wherein the second connector comprises a third arc-shaped surface and a fourth arc-shaped surface, and wherein when the electronic device is in the unfolded state and the folded state, the third arc-shaped surface abuts against the second surface, and the fourth arc-shaped surface abuts against the second slot surface.

6. The hinge mechanism of claim 5, wherein in a first process in which the electronic device changes from the unfolded state to the folded state, the first arc-shaped surface abuts against the first surface, the third arc-shaped surface abuts against the second surface, a third gap exists between the second arc-shaped surface and the first slot surface, and a fourth gap exists between the fourth arc-shaped surface and the second slot surface, wherein in a second process in which the electronic device changes from the folded state to the unfolded state, the second arc-shaped surface abuts against the first slot surface, the fourth arc-shaped surface abuts against the second slot surface, a fifth gap exists between the first arc-shaped surface and the first surface, and a sixth gap exists between the third arc-shaped surface and the second surface.

7. The hinge mechanism of claim 5, wherein the first surface is equidistant from the first slot surface, wherein the second surface is equidistant from the second slot surface, wherein in processes in which the electronic device changes from the unfolded state to the folded state and from the folded state to the unfolded state, the first arc-shaped surface abuts against the first surface, the second arc-shaped surface abuts against the first slot surface, the third arc-shaped surface abuts against the second surface, and the fourth arc-shaped surface abuts against the second slot surface.

8. The hinge mechanism of claim 5, wherein the first arc-shaped surface, the second arc-shaped surface, the third arc-shaped surface, and the fourth arc-shaped surface are circular arc surfaces, wherein a first sum of a first radius of the first arc-shaped surface and a second radius of the second arc-shaped surface is equal to a first spacing between the first surface and the first slot surface, and wherein a second sum of a third radius of the third arc-shaped surface and a fourth radius of the fourth arc-shaped surface is equal to a second spacing between the second surface and the second slot surface.

9. The hinge mechanism of claim 4, wherein the main shaft comprises a base, wherein the base comprises a third arc-shaped slot and a fourth arc-shaped slot, wherein the first swing arm comprises a first arc-shaped rotating block, wherein the first arc-shaped rotating block is accommodated in the third arc-shaped slot, wherein the first arc-shaped rotating block is slidable along a third slot surface of the third arc-shaped slot for forming a first rotatable connection between the first swing arm and the main shaft, wherein the second swing arm comprises a second arc-shaped rotating block, wherein the second arc-shaped rotating block is accommodated in the fourth arc-shaped slot, and wherein the second arc-shaped rotating block is slidable along a fourth slot surface of the fourth arc-shaped slot for forming a second rotatable connection between the second swing arm and the main shaft.

10. The hinge mechanism of claim 9, wherein the main shaft further comprises a cover covering the base, wherein the cover comprises a first protrusion and a second protrusion, wherein the first protrusion is disposed toward the third arc-shaped slot, wherein at least a part of the first arc-shaped rotating block is located between the first protrusion and the third arc-shaped slot, wherein the second protrusion is disposed toward the fourth arc-shaped slot, and wherein at least a second part of the second arc-shaped rotating block is located between the second protrusion and the fourth arc-shaped slot.

11. The hinge mechanism of claim 9, wherein the first connector comprises a first rotating shaft and a second rotating shaft, wherein the first connector is rotatably connected to the first swing arm via the first rotating shaft, wherein the first connector is rotatably connected to the first support arm via the second rotating shaft, wherein a fifth axis of the first rotating shaft is parallel to and does not coincide with a sixth axis of the second rotating shaft, wherein the second connector comprises a third rotating shaft and a fourth rotating shaft, wherein the second connector is rotatably connected to the second swing arm via the third rotating shaft, wherein the second connector is rotatably connected to the second support arm via the fourth rotating shaft, and wherein a seventh axis of the third rotating shaft is parallel to and does not coincide with an eighth axis of the fourth rotating shaft.

12. The hinge mechanism of claim 11, wherein the first arc-shaped rotating block comprises a first mounting slot comprising a first slot opening disposed toward the third arc-shaped slot, wherein the first rotating shaft is mounted in the first mounting slot, wherein a first part of a first surface of the first rotating shaft is in contact with a fifth slot surface of the first mounting slot, wherein a second part of the first surface is in contact with the third slot surface, wherein the second arc-shaped rotating block comprises a second mounting slot, wherein a second slot opening of the second mounting slot is disposed toward the fourth arc-shaped slot, wherein the third rotating shaft is mounted in the second mounting slot, wherein a third part of a second surface of the third rotating shaft is in contact with a sixth slot surface of the second mounting slot, and wherein a fourth part of the second surface is in contact with the fourth slot surface.

13. The hinge mechanism of claim 12, wherein the fifth slot surface comprises a first circular arc surface, wherein the first part of the first surface is a second circular arc surface, and wherein a first center of the first circular arc surface coincides with a second center of the second circular arc surface, wherein the sixth slot surface comprises a third circular arc surface, wherein the second surface is a fourth circular arc surface, and wherein a third center of the third circular arc surface coincides with a fourth center of the fourth circular arc surface.

14. The hinge mechanism of claim 13, wherein the third slot surface is a fourth circular arc surface, wherein the second part of the first surface is a fifth circular arc surface, wherein a fourth center of the fourth circular arc surface coincides with a fifth center of the fifth circular arc surface, wherein the fourth slot surface is a sixth circular arc surface, wherein the third part of the second surface is a seventh circular arc surface, and wherein a sixth center of the sixth circular arc surface coincides with a seventh center of the seventh circular arc surface.

15. The hinge mechanism of claim 9, wherein the first arc-shaped rotating block comprises a first jack, wherein the first connecting rod comprises a first rod part inserted into the first jack, wherein the second arc-shaped rotating block comprises a second jack, and wherein the second connecting rod comprises a second rod part inserted into the second jack.

16. The hinge mechanism of claim 4, wherein the first connector comprises a first plurality of sub-connectors that are sequentially rotatably connected, wherein the first plurality of sub-connectors is located between the first swing arm and the first support arm, wherein the first swing arm is rotatably connected to a first sub-connector in the first plurality of sub-connectors that is adjacent to the first swing arm, wherein the first support arm is rotatably connected to a second sub-connector in the first plurality of sub-connectors that is adjacent to the first support arm, wherein the second connector comprises a second plurality of sub-connectors that are sequentially rotatably connected and located between the second swing arm and the second support arm, wherein the second swing arm is rotatably connected to a third sub-connector in the second plurality of sub-connectors that is adjacent to the second swing arm, and wherein the second support arm is rotatably connected to a fourth sub-connector in the second plurality of sub-connectors that is adjacent to the second support arm.

17. The hinge mechanism of claim 1, wherein a first axis center at which the first swing arm rotates around the main shaft is located on a first side of the main shaft and that is away from the flexible display, and wherein a second axis center at which the second swing arm rotates around the main shaft is located on a second side of the main shaft and that is away from the flexible display.

18. An electronic device comprising:

a first housing;

a second housing;

a flexible display;

a hinge mechanism comprising a first side and a second side opposite the first side, wherein the first housing is disposed on the first side, the second housing is disposed on the second side, and the first housing and the second housing are rotatably connected to the hinge mechanism for folding and unfolding the electronic device, wherein the flexible display is fastened to the first housing and the second housing, wherein the flexible display continuously covers the first housing, the second housing, and the hinge mechanism, and wherein the hinge mechanism comprises:

a main shaft comprising a third side and a fourth side opposite the third side;

a first swing arm disposed on the third side and rotatably connected to the main shaft;

a second swing arm disposed on the fourth side and rotatably connected to the main shaft;

a synchronization assembly located between the first swing arm and the second swing arm along an axial direction of the hinge mechanism, wherein the synchronization assembly comprises:

a first gear assembly comprising:

a first gear member comprising:

a first gear comprising a first gear surface and a first end part, wherein a first axis of the first gear is parallel to and does not coincide with a second axis along which the first swing arm rotates around the main shaft; and a first connection part located on the first end part and facing the first swing arm; and a first connecting rod slidably connected to the first connection part and rotatably connected to the first swing arm; and a second gear assembly comprising:

a second gear member comprising:

a second gear comprising a second gear surface and second end part, wherein the second gear surface is engaged with the first gear surface, and wherein a third axis of the second gear is parallel to and does not coincide with a fourth axis along which the second swing arm rotates around the main shaft; and a second connection part located on the second end part and facing the second swing arm; and a second connecting rod slidably connected to the second connection part and rotatably connected to the second swing arm; and a flexible display comprising a foldable part and configured to continuously cover the first housing, the second housing, and the hinge mechanism, wherein the flexible display is fastened to the first housing and the second housing, and wherein the hinge mechanism is disposed opposite to the foldable part.

19. The electronic device of claim 18, wherein the first connection part comprises a first insertion slot, wherein the first connecting rod comprises a first sliding part inserted into the first insertion slot, wherein the first sliding part is slidable along the first insertion slot, wherein the second connection part comprises a second insertion slot, wherein the second connecting rod comprises a second sliding part inserted into the second insertion slot, and wherein the second sliding part is slidable along the second insertion slot.

20. A hinge mechanism comprising:

a main shaft comprising a first side and a second side opposite the first side;

a first swing arm disposed on the first side and rotatably connected to the main shaft;

a second swing arm disposed on the second side rotatably connected to the main shaft; and a synchronization assembly located between the first swing arm and the second swing arm along an axial direction of the hinge mechanism, wherein the synchronization assembly comprises:

a first gear assembly comprising:

a first gear member; and a first connecting rod slidably connected to the first gear member and rotatably connected to the first swing arm; and a second gear and assembly comprising:

a second gear member engaged with the first gear member; and a second connecting rod slidably connected to the second gear member and rotatably connected to the second swing arm, wherein the synchronization assembly is configured to:

synchronously rotate the first gear assembly and the second gear assembly towards each other during a folding process of an electronic device, and synchronously rotate the first gear assembly and the second gear assembly away from each other during an unfolding process of the electronic device.

* * * * *